(12) United States Patent
Minagata et al.

(10) Patent No.: US 10,998,592 B2
(45) Date of Patent: May 4, 2021

(54) POWER STORAGE DEVICE

(71) Applicant: KABUSHIKI KAISHA TOYOTA JIDOSHOKKI

(72) Inventors: Atsushi Minagata, Kariya (JP); Motoaki Okuda, Kariya (JP); Masami Tomioka, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 153 days.

(21) Appl. No.: 16/129,317

(22) Filed: Sep. 12, 2018

(65) Prior Publication Data
US 2019/0027711 A1 Jan. 24, 2019

Related U.S. Application Data

(63) Continuation of application No. 14/409,055, filed as application No. PCT/JP2013/063969 on May 20, 2013, now Pat. No. 10,158,101.

(30) Foreign Application Priority Data

Jun. 26, 2012 (JP) ................................. 2012-143189
Aug. 28, 2012 (JP) ................................. 2012-187667

(51) Int. Cl.
*H01M 2/02* (2006.01)
*H01M 50/10* (2021.01)
(Continued)

(52) U.S. Cl.
CPC ....... *H01M 50/10* (2021.01); *H01M 10/0413* (2013.01); *H01M 50/116* (2021.01);
(Continued)

(58) Field of Classification Search
CPC ......... H01M 10/0413; H01M 10/0585; H01M 2220/20; H01M 2/0217; H01M 2/0237;
(Continued)

(56) References Cited

U.S. PATENT DOCUMENTS 4,169,540 A 10/1979 Larsson et al.
2007/0178385 A1 8/2007 Chen et al.
(Continued)

FOREIGN PATENT DOCUMENTS

CN 102386437 A 3/2012
JP 07220753 A 8/1995
(Continued)

OTHER PUBLICATIONS

Communication dated Aug. 30, 2016, from the Japanese Patent Office in counterpart Japanese application No. 2014-522483.
(Continued)

*Primary Examiner* — Victoria H Lynch
(74) *Attorney, Agent, or Firm* — Sughrue Mion, PLLC

(57) ABSTRACT

A power storage device includes an electrode assembly, a case that houses the electrode assembly, and an insulating sheet, which insulates the electrode assembly and the case from each other. The electrode assembly has a layered structure in which positive electrodes and negative electrodes are stacked. The electrode assembly has a first end face, which is orthogonal to the stacking direction, two primary faces, which are located on both sides in the stacking direction, and a tab, which extends on the first end face in the direction orthogonal to the stacking direction. The insulating sheet has a folded box shape, and further has two primary face covering portions, which respectively cover the primary faces of the electrode assembly, and non-primary-face covering portions, which cover the first end face of the electrode assembly and faces other than the primary faces thereof and are continuous with the primary face covering portions. The non-primary face covering portions overlap at least partially with each other.

11 Claims, 24 Drawing Sheets

(51) Int. Cl.
  H01M 10/04    (2006.01)
  H01M 50/116   (2021.01)
  H01M 50/463   (2021.01)
  *H01M 10/0585*    (2010.01)
  *H01M 50/54*      (2021.01)
  *H01M 50/103*     (2021.01)
  *H01M 50/543*     (2021.01)

(52) U.S. Cl.
  CPC ...... H01M 50/463 (2021.01); *H01M 10/0585* (2013.01); *H01M 50/103* (2021.01); *H01M 50/54* (2021.01); *H01M 50/543* (2021.01); *H01M 2220/20* (2013.01)

(58) Field of Classification Search
  CPC .. H01M 2/024; H01M 2/0262; H01M 2/0275; H01M 2/0277; H01M 2/18; H01M 2/266; H01M 2/305
  See application file for complete search history.

(56) References Cited

U.S. PATENT DOCUMENTS

| | | |
|---|---|---|
| 2011/0183181 A1 | 7/2011 | Moon et al. |
| 2011/0236750 A1 | 9/2011 | Kohno et al. |
| 2012/0052360 A1 | 3/2012 | Fujiwara et al. |
| 2012/0107681 A1 | 5/2012 | Kogure |
| 2012/0160559 A1 | 6/2012 | Tsutsumi et al. |
| 2014/0308555 A1* | 10/2014 | Hattori .............. H01M 10/0431 |
| 2015/0357607 A1 | 12/2015 | Tsutsumi et al. |

FOREIGN PATENT DOCUMENTS

| | | |
|---|---|---|
| JP | 2009-170137 A | 7/2009 |
| JP | 2010198946 A | 9/2010 |
| JP | 2010287456 A | 12/2010 |
| JP | 2011-155001 A | 8/2011 |
| JP | 2011-198663 A | 10/2011 |
| JP | 2012151099 A | 8/2012 |

OTHER PUBLICATIONS

International Preliminary Report on Patentability issued by the International Searching Authority in counterpart Application No. PCT/JP2013/063969.

International Search Report of PCT/JP2013/063969, dated Jun. 25, 2013. [PCT/ISA/210].

* cited by examiner

POWER STORAGE DEVICE

CROSS REFERENCE TO RELATED APPLICATIONS

This is a continuation of U.S. application Ser. No. 14/409,055 filed Dec. 18, 2014 (allowed), which is a National Stage of International Application No. PCT/JP2013/063969 filed May 20, 2013, claiming priority based on Japanese Patent Application Nos. 2012-143189, filed Jun. 26, 2012 and 2012-187667, filed Aug. 28, 2012, the contents of all of which are incorporated herein by reference in their entirety.

FIELD OF THE INVENTION

The present invention relates to a power storage device.

BACKGROUND OF THE INVENTION

Vehicles such as electric vehicles (EVs) and plug in hybrid vehicle (PHVs) are equipped with a rechargeable battery, which is a power storage device that stores power fed to a drive motor. For example, the rechargeable battery includes an electrode assembly having a positive electrode and a negative electrode, and a case that houses the electrode assembly. An insulating sheet that covers the electrode assembly to insulate the electrode assembly from the case may be provided. In this case, the insulating sheet may be shaped like a spread polygon in advance and then, assembled such that adjacent sides are butted to house the electrode assembly. Refer to Patent Document 1, for example.

PRIOR ART DOCUMENTS

Patent Documents

Patent Document 1: Japanese Laid-Open Patent Publication No. 2011-198663

SUMMARY OF THE INVENTION

However, in the configuration in which two sides are butted as described above, the electrode assembly to be covered tends to be exposed from a gap. Thus, ensuring of insulation between the electrode assembly and the case has a room for improvement.

An objective of the present invention is to provide a power storage device capable of improving insulation between the electrode assembly and the case.

To achieve the foregoing objective and in accordance with one aspect of the present invention, a power storage device is provided that includes an electrode assembly, a case, and an insulating sheet. The electrode assembly has a layered structure in which a positive electrode and a negative electrode are stacked. The electrode assembly is configured to have a first end face orthogonal to a stacking direction, two primary faces located on both sides in the stacking direction, and a tab extending from the first end face in a direction orthogonal to the stacking direction. The case is configured to house the electrode assembly. The insulating sheet is configured to insulate the electrode assembly from the case. The insulating sheet is shaped like a folded box, has two primary-face covering portions that cover the primary faces of the electrode assembly, and has non-primary-face covering portions that cover the first end face of the electrode assembly and faces other than the primary faces and are continuous with the primary-face covering portions. The non-primary-face covering portions overlap each other at least partially.

With such a configuration, since the primary-face covering portions are continuous with the non-primary-face covering portions, no gap between the portions exists. Thus, the electrode assembly is hardly exposed. Further, since the non-primary-face covering portions overlap each other at least partially, a gap from which the electrode assembly is exposed is hardly generated between the non-primary-face covering portions. This improves the insulation.

The insulating sheet in a spread state is preferably rectangular as a whole. With such a configuration, the rectangular insulating sheet of relatively simple shape is used to form a box shape. The insulating sheet of complicated shape is not required, facilitating manufacturing of the insulating sheet. As a result, costs for the power storage device are reduced. The rectangular sheet only needs to be rectangular as a whole and for example, the sheet may be chamfered or have a recess (a hole) or projection.

The non-primary-face covering portions preferably include a bottom-face covering portion that covers a second end face, which is an end face opposite to the first end face of the electrode assembly, and two side-face covering portions that cover both side faces, which are two end faces orthogonal to the primary faces, and the second end face. In the insulating sheet in a spread state, the bottom-face covering portion is continuous with the primary-face covering portions and provided between the primary-face covering portions. In the insulating sheet in the spread state, the primary-face covering portions and the bottom-face covering portion constitute a rectangular base portion as a whole. In the insulating sheet in the spread state, the side-face covering portions extend along sides of the base portion. The insulating sheet is folded along each of boundary lines between the primary-face covering portions and the bottom-face covering portion and boundary lines between the base portion and the side-face covering portions to form a box. Given that a length of the electrode assembly in the stacking direction is D and an extending length of the side-face covering portions from the base portion is W, the length D and the length W are set to satisfy a relationship of D/2<W≤D. With such a configuration, the side-face covering portions overlap each other by folding the insulating sheet along the boundary lines. Thereby, an overlapping area can be formed by a relatively simple operation. This limits a decrease in workability, which may be caused by improvement of the insulation.

"The extending length of the side-face covering portions from the base portion" means the length of each of the side-face covering portions, but the side-face covering portions do not need to have the same length, and may have different lengths as long as the lengths satisfy the relational expression.

The power storage device preferably further includes a protruding portion configured to extend, in the insulating sheet in the spread state, from two opposed sides of the base portion in a direction orthogonal to the extending direction of the side-face covering portions. The protruding portion protrudes from the first end face of the electrode assembly in the projecting direction of the tab. With such a configuration, the protruding portion is arranged between the tab and the case. Thus, insulation between the tab and the case is achieved by using the structure for insulating the electrode assembly from the case.

Given that a projecting length of the tab from the first end face is T0, and a protruding dimension of the protruding portion from the first end face is K, the length D, the length T0, and the dimension K are preferably set to satisfy a relationship of K≥T0 and T0≤D/2. With such a configuration, since K≥T0, an area exposed from the protruding portion hardly is formed in the tab. This achieves insulation between the tab and the case more favorably. On condition that the length D of the electrode assembly in the stacking direction is the same, a space for the tab is smaller in the case of T0≤D/2 than the case of T0>D/2. This reduces the space for the power collection structure. Further, the protruding dimension K can be decreased by decreasing the projecting length T0 of the tab from the first end face so as to satisfy the relationship of T0≤D/2. As a result, it is possible to reduce the size of the insulating sheet and, reduce costs for the insulating sheet, accordingly.

In the insulating sheet in the spread state, the side-face covering portions preferably have incisions formed from ends of the boundary lines between the primary-face covering portions and the bottom-face covering portion along extended lines of the boundary line. The side-face covering portions divided into a plurality of sections by the incisions overlap each other. With such a configuration, the number of folded areas is reduced, facilitating the folding operation. This improves workability while ensuring insulation.

Ends of the incisions on the side of the base portion each preferably have a hole. With such a configuration, the holes disperse loads applied to the ends of the incisions on the side of the base portion when the insulating sheet is folded. This prevents the situation in which local loads are applied to the ends to tear the insulating sheet when the insulating sheet is folded.

The case preferably has an opening into which the electrode assembly is inserted, the electrode assembly surrounded by the insulating sheet is preferably inserted into the opening to be housed in the case, and the non-primary-face covering portions preferably overlap each other such that an area continuous with the covering portion that covers a face to which the electrode assembly is inserted is an outermost layer. With such a configuration, when the electrode assembly is inserted into the insulating sheet, the non-primary-face covering portions are unlikely to be caught. This reduces decrease in the insertion performance, which is caused by overlapping of the non-primary-face covering portions.

The non-primary-face covering portions preferably include a bottom-face covering portion that covers a second end face, which is an end face opposite to the first end face of the electrode assembly, and the bottom-face covering portion overlaps at least partially. With such a configuration, the bottom-face covering portion, which is susceptible to stress, and from which the electrode assembly is easily exposed, due to installation manner, overlaps at least partially. This further improves the insulation.

The overlapping area of the bottom-face covering portions is preferably in contact with an inner face of the case. With such a configuration, since the overlapping area of the bottom-face covering portion is in contact with the inner face of the case, even when the insulating sheet rubs against the inner face of the case at the contact area due to displacement of the electrode assembly, the electrode assembly is unlikely to be exposed. This favorably restrains the electrode assembly from being exposed by rubbing between the bottom-face covering portion and the inner face of the case.

The insulating sheet preferably covers a predetermined region of the first end face other than the region where the tab extends. This further improves the insulation in the first end face.

The power storage device preferably further includes an electrode terminal partially exposed from the case and a conductive member configured to connect the tab to the electrode terminal. Given a length of the tab and the conductive member from the first end face in the direction orthogonal to the first end face is T1, and a protruding dimension of the protruding portion from the first end face is K, the length D, the length T1, and the dimension K are preferably set to satisfy a relationship of 0<T1<K<D. With this configuration, the tab and the conductive member are wholly surrounded by the protruding portion. This further improves the insulation between the case and the set of the tab and the conductive member.

The power storage device is preferably a rechargeable battery.

Effects of the Invention

According to the present invention, insulation between the electrode assembly and the case is improved.

DETAILED DESCRIPTION OF THE PREFERRED EMBODIMENTS

First Embodiment

A power storage device according to the present invention will be described with reference to FIGS. 1 to 6. The power storage device is installed in a vehicle (an automobile or an industrial vehicle) and serves to drive a drive motor (an electric motor) in the vehicle. For convenience, in FIG. 5, the thicknesses of electrodes 21 and 22, a separator 23, and a case 11 are illustrated as different from the actual sizes as necessary.

Figure 1:
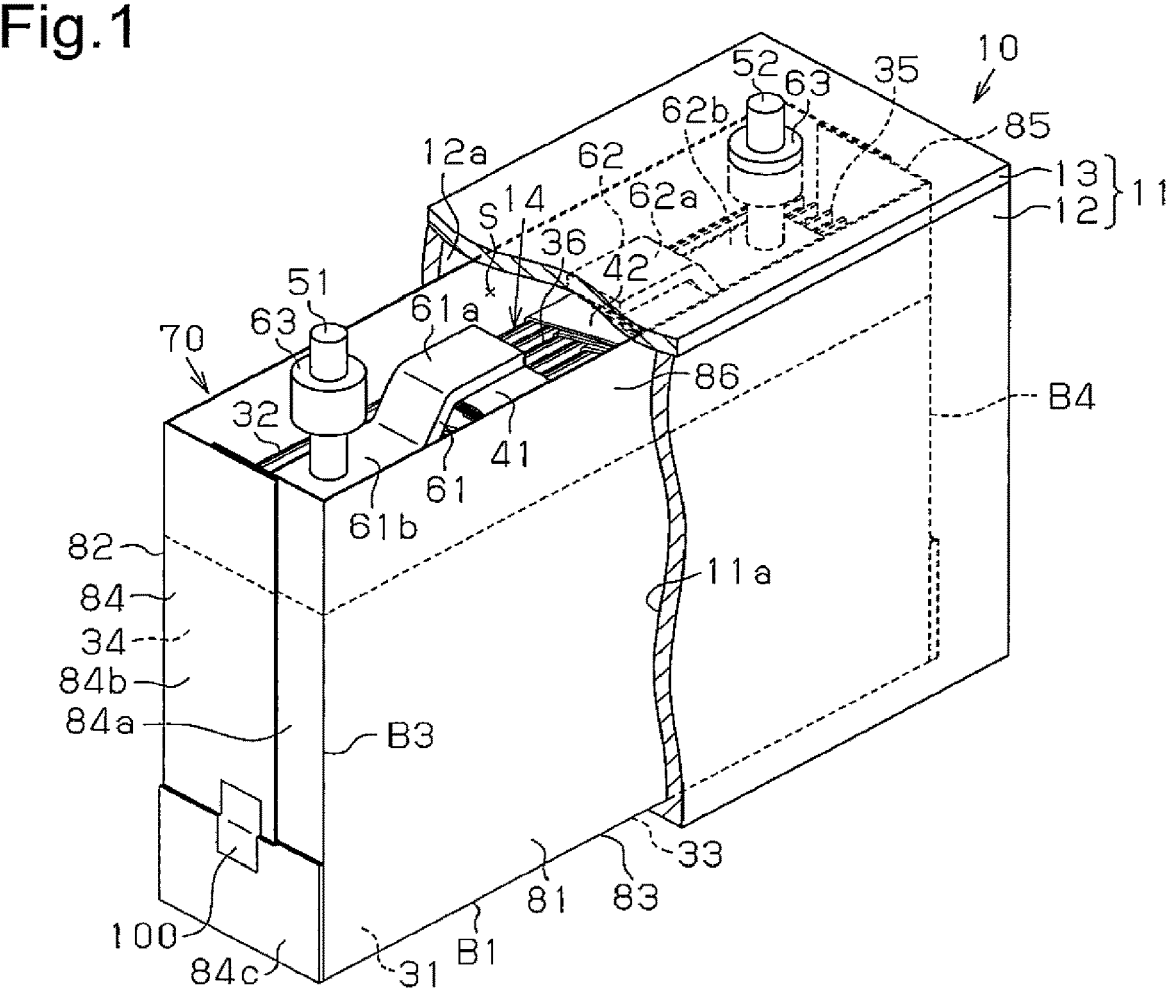
FIG. 1 is a perspective view of a rechargeable battery according to a first embodiment.

As shown in FIG. 1, a rechargeable battery 10 as the power storage device is a lithium-ion rechargeable battery, and has a metallic case 11 constituting a shell for the cell. The case 11 includes a container 12 shaped like a box with a bottom, in particular, a rectangular parallelepiped having an opening 12a in one side face thereof, and a lid 13 that closes the opening 12a.

Figure 3:
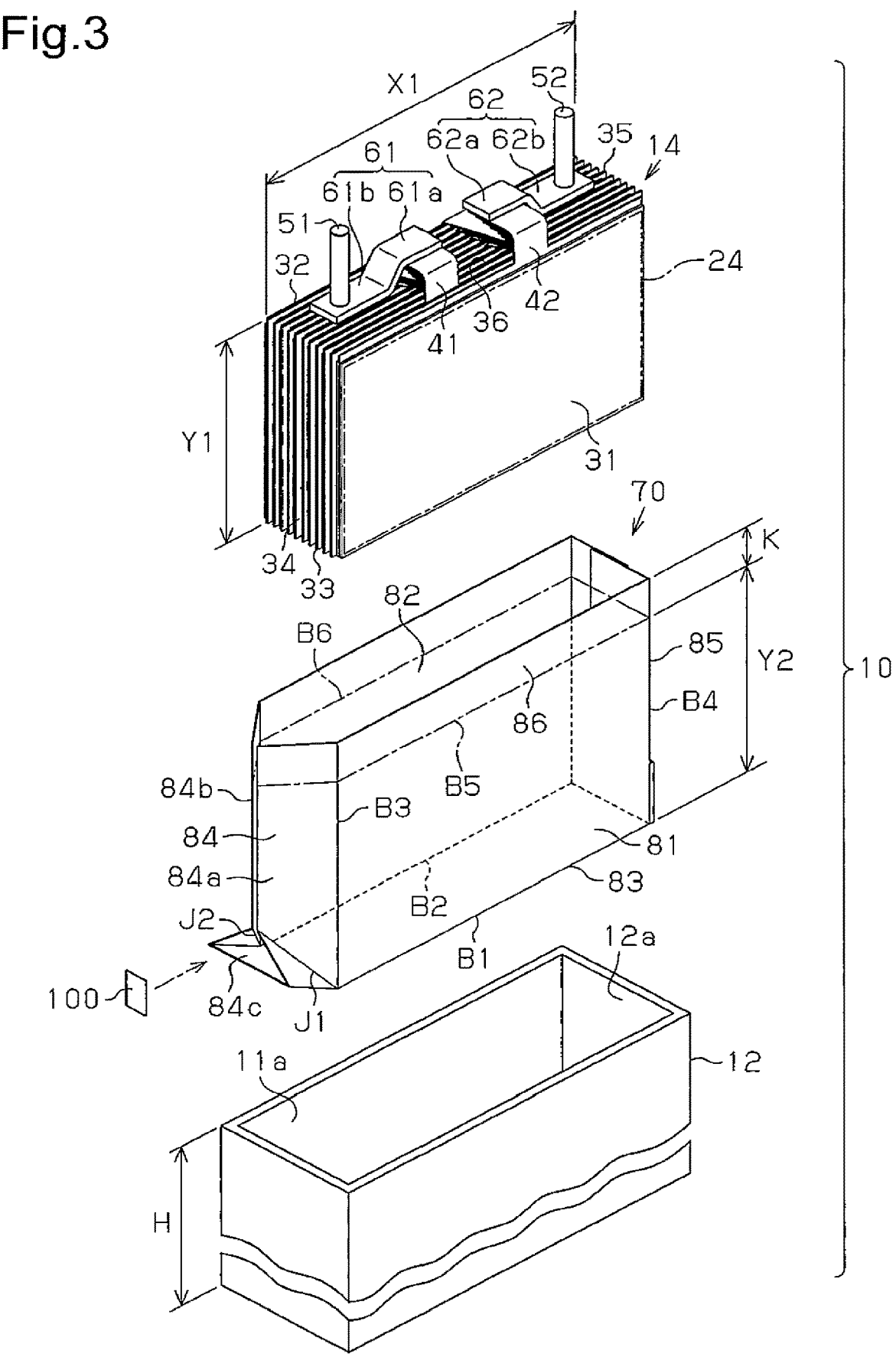
FIG. 3 is an exploded perspective view of the rechargeable battery.

The case 11 houses an electrode assembly 14 as a charge-discharge component and an electrolyte solution (not shown) as an electrolyte. As shown in FIG. 3, the electrode assembly 14 has a shape of rectangular parallelepiped corresponding to the rectangular parallelepiped-shaped inner space of the container 12, and is dimensioned to have a predetermined gap from the inner face of the container 12 when being housed in the container 12.

Figure 2:
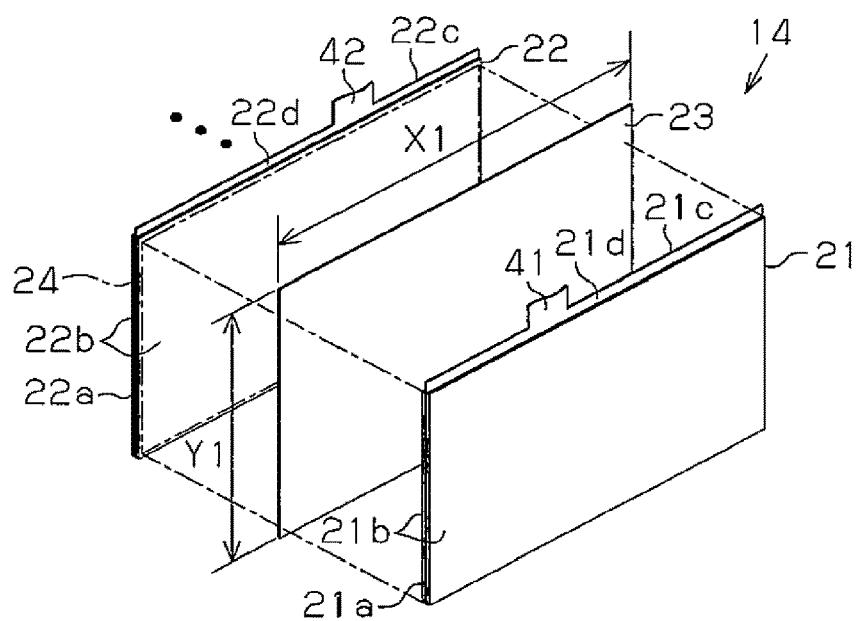
FIG. 2 is an exploded perspective view of an electrode assembly.

As shown in FIG. 2, the electrode assembly 14 includes a positive electrode 21, a negative electrode 22, a separator 23 formed of a porous film through which conductive ions (lithium ions) involved in electric conduction can pass.

The electrodes 21 and 22, and the separator 23 are each a rectangular sheet. Describing in detail, the lengths of two adjacent sides (the longitudinal length and the transverse length) of the negative electrode 22 are set to be greater than the lengths (the longitudinal length and the transverse length) of two adjacent sides of the positive electrode 21. The lengths of two adjacent sides (the longitudinal length and the transverse length) of the separator 23 are set to be greater than the lengths of two adjacent sides of the negative electrode 22. That is, the negative electrode 22 is dimensioned to cover the sheet face of the positive electrode 21, and the separator 23 is dimensioned to cover both of the sheet face of the positive electrode 21 and the sheet face of the negative electrode 22.

The positive electrode 21 includes a rectangular positive-electrode metal foil (for example, aluminum foil) 21a and a positive-electrode active material layer 21b formed by applying a positive-electrode active material to the sheet face of the positive-electrode metal foil 21a. The positive-electrode active material layer 21b is formed on the sheet face of the positive electrode 21 (the positive-electrode metal foil 21a) except for a positive-electrode uncoated portion 21d that extends along an upper end 21c (the first end) of the positive electrode 21 and has a predetermined width in a direction orthogonal to the upper end 21c.

The negative electrode 22 includes a rectangular negative-electrode metal foil (for example, copper foil) 22a, which is smaller than the positive-electrode metal foil 21a, and a negative-electrode active material layer 22b formed by applying a negative-electrode active material to a sheet face of the negative-electrode metal foil 22a. The negative-electrode active material layer 22b is formed on the sheet face of the negative electrode 22 (the negative-electrode metal foil 22a) except for a negative-electrode uncoated portion 22d that extends along an upper end 22c of the negative electrode 22 and has a predetermined width in a direction orthogonal to the upper end 22c. The negative-electrode active material layer 22b is larger than the positive-electrode active material layer 21b so as to cover the entire positive-electrode active material layer 21b.

The electrode assembly 14 has a layered structure in which the positive electrode 21 and the negative electrode 22 are stacked with the separator 23 in between. Describing in detail, the electrodes 21 and 22 and the separator 23 are stacked in the state where the entire positive-electrode active material layer 21b is covered with the negative-electrode active material layer 22b, and the positive electrode 21 and the negative electrode 22 are covered with the separator 23. In this case, regions where the positive-electrode active material layer 21b and the negative-electrode active material layer 22b are opposed to each other with the separator 23 in between (hereinafter referred to as opposed regions 24) contribute to charge and discharge. The stacking direction of the electrode assembly 14, in particular, the stacking direction of the positive electrode 21 and the negative electrode 22 can also be described as the opposing direction of the opposed regions 24.

Since the separator 23 is larger than each of the electrodes 21 and 22, the outer periphery of the separator 23 protrudes outward from the outer periphery of the negative electrode 22 and the outer periphery of the positive electrode 21 along the sheet faces. For this reason, the electrodes 21 and 22 are unlikely to make a short circuit.

In the configuration in which the outer periphery of the separator 23 protrudes outward from the outer peripheries of the electrodes 21 and 22 along the sheet faces, as shown in FIG. 3, faces 33 to 36 among faces 31 to 36 of the electrode assembly 14 except for primary faces 31 and 32 on both sides of the electrode assembly 14 in the stacking direction are defined by end faces of the separator 23. That is, the faces 33 to 36 that are end faces orthogonal to the stacking direction in the electrode assembly 14 are flush with the end faces of the separator 23. In this case, as shown in FIGS. 2 and 3, a longitudinal length X1 of the separator 23 is a longitudinal length X1 of the electrode assembly 14 when viewed from the stacking direction, and a transverse length Y1 of the separator 23 is a transverse length Y1 of the electrode assembly 14 when viewed from the stacking direction. The primary faces 31 and 32 are opposed faces located opposed to the opposed regions 24, and are larger than the other faces 33 to 36.

As shown in FIG. 1, a positive-electrode tab 41 and a negative-electrode tab 42 project from the upper end face 36 (a first end face), which is orthogonal to the stacking direction and is located near the lid 13 in the electrode assembly 14. As shown in FIG. 2, the positive-electrode tab 41 projects from the upper end 21c, which extends in the longitudinal direction of the positive electrode 21, and the negative-electrode tab 42 projects from the upper end 22c, which extends in the longitudinal direction of the negative electrode 22.

Figure 5:
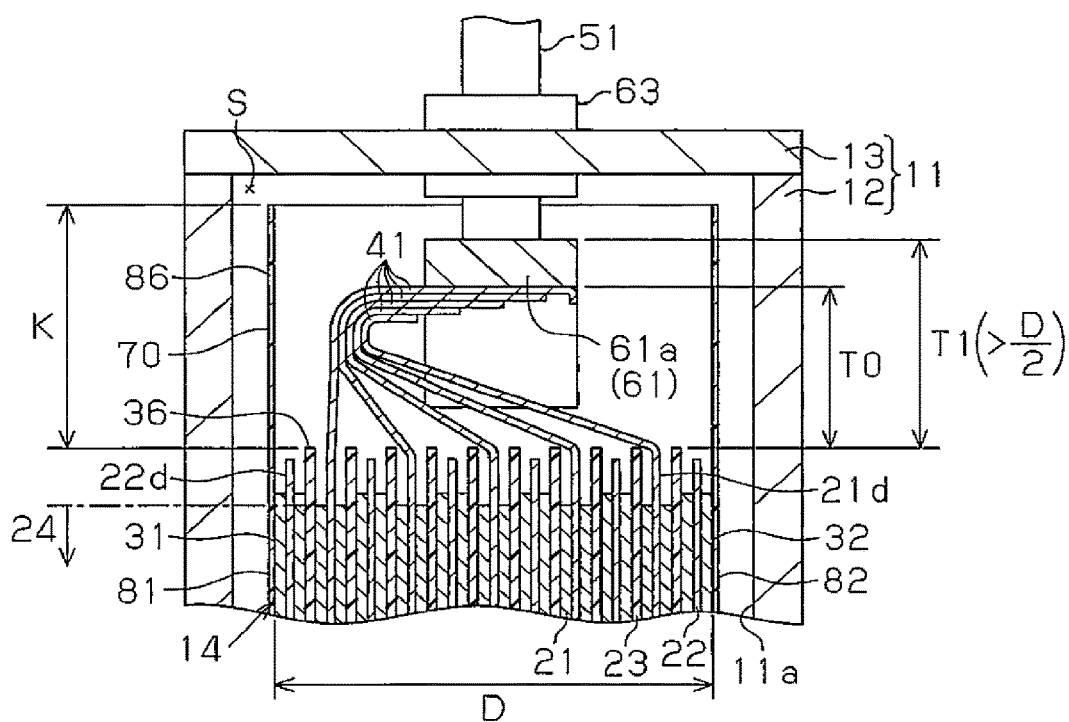
FIG. 5 is a partial cross-sectional view of the rechargeable battery.

As shown in FIG. 2, the electrodes 21 and 22 are stacked such that the tabs 41 and 42 of the same polarity are aligned in the stacking direction, and the tabs of the opposite polarities do not overlap each other in the stacking direction. As shown in FIGS. 3 and 5, the positive-electrode tabs 41 are collected at one side in the stacking direction of the electrode assembly 14, and are folded in the collected state toward the side opposite to the one side. The positive-electrode tabs 41 are electrically connected to each other by welding the overlapping areas of the positive-electrode tabs 41. As shown in FIG. 3, the negative-electrode tabs 42 are similarly collected at one side in the stacking direction of the electrode assembly 14, and are folded in the collected state toward the side opposite to the one side. In this case, the tabs 41 and 42 project, that is, extend from the upper end face 36 in the direction orthogonal to the stacking direction. Noting that the tabs 41 and 42 project from the upper ends 21c, 22c, which extend along the longitudinal direction of the electrodes 21 and 22, the transverse direction of the electrode assembly 14 (the separator 23) when viewed from the stacking direction is the projecting direction of the tabs 41 and 42. The longitudinal direction of the electrode assembly 14 (the separator 23) when viewed from the stacking direction is the direction orthogonal to the projecting direction of the tabs 41 and 42.

As shown in FIG. 3, a length Y1 in the direction orthogonal to the upper end face 36 in the electrode assembly 14, in particular, in the projecting direction of the tabs 41 and 42 in the electrode assembly 14 is set to be smaller than a height H (the standing dimension from the bottom of the container 12) of the case 11. As a result, as shown in FIG. 5, in the state where the case 11 houses the electrode assembly 14, a space S is formed between the electrode assembly 14 and the lid 13. The space S houses the tabs 41 and 42. In other words, the length Y1 in the projecting direction of the tabs 41 and 42 in the electrode assembly 14 is set to be smaller than the height H of the case 11 to form the space S that can house the tabs 41 and 42.

Describing for confirmation, the length of each of two adjacent sides of the positive electrode 21 does not include the length of the positive-electrode tab 41, and the length of each of two adjacent sides of the negative electrode 22 does not include the length of the negative-electrode tab 42.

As shown in FIG. 1, the rechargeable battery 10 includes a positive-electrode terminal 51 and a negative-electrode terminal 52 as electrode terminals that can be accessed from the outside of the case 11, and a positive-electrode conductive member 61 and a negative-electrode conductive member 62 that connect the terminal 51 to the tab 41, and connect the terminal 52 to the tab 42, respectively.

As shown in FIG. 3, the positive-electrode conductive member 61 is formed by bending a rectangular metal plate to be shaped like a crank as a whole when viewed from the transverse direction. The positive-electrode conductive member 61 is attached such that a first positive-electrode part 61a as a member on one side of the curved part in the longitudinal direction overlaps (contacts) the outermost layer of each positive-electrode tabs 41 from the side corresponding to the lid 13, and a second positive-electrode part 61b as a member on the other side of the curved part in the longitudinal direction is located closer to the upper end face 36 of the electrode assembly 14 than the first positive-electrode part 61a.

As shown in FIG. 1, the positive-electrode terminal 51 extends through the case 11 while being insulated with an insulating ring 63. Describing in detail, the positive-electrode terminal 51 is partially exposed from the case 11, and one end in the case 11 contacts the second positive-electrode part 61b. The contact area of the tabs 41 and 42 and the first positive-electrode part 61a, and the contact area of the second positive-electrode part 61b and the positive-electrode terminal 51 are welded.

Also on the negative-electrode side, a first negative-electrode part 62a of the crank-like negative-electrode conductive member 62 contacts the outermost layer of each negative-electrode tab 42, and a second negative-electrode part 62b contacts the negative-electrode terminal 52 that extends through the case 11 while being insulated with the insulating ring 63, and each contact area is welded.

In this manner, by accessing the terminals 51 and 52, power in the electrode assembly 14 can be taken out of the case 11, and power can be fed to the electrode assembly 14.

As shown in FIG. 5, the sum of a projecting length T0 of each of the bent positive-electrode tabs 41 (the negative-electrode tabs 42) from the upper end face 36 and the thickness of the positive-electrode conductive member 61 (the first positive-electrode part 61a) (the thickness of the negative-electrode conductive member 62) is a collecting dimension T1, which defines a space required for power collection (the connection between the terminals 51, 52 and the electrode assembly 14). The collecting dimension T1 is set to be greater than half a length D in the stacking direction of the electrode assembly 14 (hereinafter referred to as merely the thickness D of the electrode assembly 14) (T1>D/2). The projecting length T0 is the length from the upper end face 36 in the direction orthogonal to the upper end face 36. In other words, the projecting length T0 is the distance between the upper end face 36 and the first positive-electrode part 61a of the positive-electrode conductive member 61. Noting the welded area of the outermost layer of each positive-electrode tab 41 and the positive-electrode conductive member 61, the projecting length T0 can also be described as the distance between the upper end face 36 and the welded area.

The rechargeable battery 10 includes an insulating sheet 70 that insulates the electrode assembly 14 from the case 11. The insulating sheet 70 will be described below in detail.

As shown in FIG. 1, the insulating sheet 70 is shaped like a box that covers the faces 31 to 35 except for the upper end face 36, on which the tabs 41 and 42 extend. Describing in detail, the insulating sheet 70 includes primary-face covering portions 81 and 82 that cover the primary faces 31 and 32 in the stacking direction of the electrode assembly 14, respectively, and a bottom-face covering portion 83 that covers a bottom face 33 (the second end face) as an end face opposite to the upper end face 36. The insulating sheet 70 further includes side-face covering portions 84 and 85 that cover the side faces 34 and 35 as end faces orthogonal to the bottom face 33 and the primary faces 31 and 32 in the stacking direction of the electrode assembly 14, respectively. The bottom-face covering portion 83 and the side-face covering portions 84 and 85 constitute "non-primary-face covering portions". In the present embodiment, the bottom-face covering portion 83 corresponds to a first non-primary-face covering portion, and the side-face covering portions 84 and 85 correspond to a second non-primary-face covering portion.

As shown in FIG. 1, the insulating sheet 70 includes a protruding portion 86 protruding from the upper end face 36 of the electrode assembly 14 in the projecting direction of the tabs 41 and 42. The protruding portion 86 is continuous with the primary-face covering portions 81 and 82 and the side-face covering portions 84 and 85, and is shaped like a frame as a whole. The tabs 41 and 42, and the conductive members 61 and 62 are located within the space surrounded with the protruding portion 86. That is, the protruding portion 86 is located between the tabs 41 and 42 and the conductive members 61 and 62, and an inner face 11a of the case 11.

Figure 4:
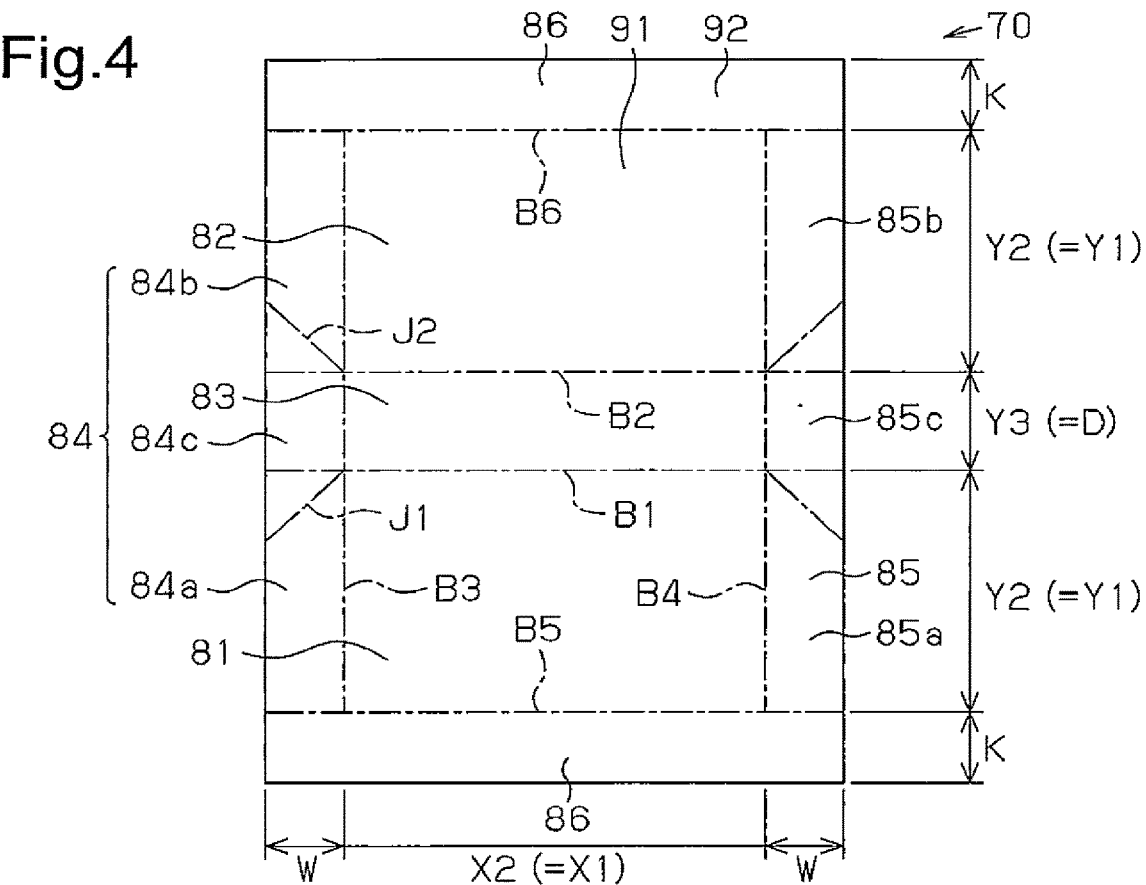
FIG. 4 is a front view of a spread insulating sheet.

Describing each of the portions 81 to 86 of the insulating sheet 70 in the spread state in detail, as shown in FIG. 4, the insulating sheet 70 in the spread state includes a rectangular base portion 91 and an extending portion 92 that extends from the base portion 91 toward the outer periphery of the sheet face, and is rectangular as a whole. For convenience of description, in the following description, otherwise specifically recited, the base portion 91 and the extending portion 92 are dealt in the insulating sheet 70 in the spread state.

As shown in FIG. 4, the base portion 91 is configured of the primary-face covering portions 81 and 82 and the bottom-face covering portion 83. The primary-face covering portions 81 and 82 are continuous with the bottom-face covering portion in the longitudinal direction of the insulating sheet 70. Describing in detail, the primary-face covering portion 81 is continuous with the bottom-face covering portion 83 via a first boundary line B1, and the primary-face covering portion 82 is continuous with the bottom-face covering portion 83 via a second boundary line B2. That is, the bottom-face covering portion 83 is located between the primary-face covering portions 81 and 82.

The primary-face covering portions 81 and 82 and the bottom-face covering portion 83 take the same shape as the faces 31 to 33 to be covered of the electrode assembly 14. Describing in detail, a length X2 of the primary-face covering portions 81 and 82 and the bottom-face covering portion 83 in the direction orthogonal to the projecting direction of the tabs 41 and 42 of the electrode assembly 14 (see FIG. 4) is the same as the length X1 of the electrode assembly 14 in the projecting direction of the tabs 41 and 42. The length X2 is a transverse length of the base portion 91.

A length Y2 of the primary-face covering portions 81 and 82 in the projecting direction of the tabs 41 and 42 of the electrode assembly 14 (see FIGS. 3 and 4) is the same as the length Y1 of the electrode assembly 14 in the projecting direction. The length Y2 is the longitudinal length of the primary-face covering portions 81 and 82 of the insulating sheet 70 in the insulating sheet 70 in the spread state.

A length Y3 of the bottom-face covering portion 83 in the stacking direction (see FIG. 4) is the same as the thickness D of the electrode assembly 14. The length Y3 is the longitudinal length of the bottom-face covering portion 83 of the insulating sheet 70 in the insulating sheet 70 in the spread state.

In the insulating sheet 70 in the spread state, the side-face covering portions 84 and 85 and the protruding portion 86 are included in the extending portion 92. The side-face covering portions 84 and 85 are portions extending along a side of the base portion 91, in particular, a short side of the base portion 91 in the insulating sheet 70. In this case, the side-face covering portion 84 is continuous with the base portion 91 via a third boundary line B3, and the side-face covering portion 85 is continuous with the base portion 91 via a fourth boundary line B4. The boundary lines B3, B4 are long sides of the base portion 91.

In the insulating sheet 70 in the spread state, a first width W as the width (the transverse length) of the side-face covering portions 84 and 85 is set to be greater than half the thickness D of the electrode assembly 14 and smaller than the thickness D of the electrode assembly 14 (D/2<W<D).

The first width W is the length of an extending portion of the side-face covering portions 84 and 85 from the base portion 91. In other words, the first width W is the length of the side-face covering portion 84 in the direction orthogonal to the third boundary line B3, or the length of the side-face covering portion 85 in the direction orthogonal to the fourth boundary line B4.

In the insulating sheet 70 in the spread state, the protruding portion 86 extends from two opposed sides of the base portion 91 (in particular, short sides of the base portion 91) in the direction orthogonal to the extending direction of the side-face covering portions 84 and 85. Describing in detail, in the spread insulating sheet 70, the protruding portion 86 is a portion extending from a short side of the base portion 91 (and the longitudinal ends of the side-face covering portions 84 and 85) along the long sides. The protruding portion 86 is configured of a portion continuous with the primary-face covering portion 81 via a fifth boundary line B5 and a portion continuous with the primary-face covering portion 82 via a sixth boundary line B6. The boundary lines B5, B6 are short sides of the base portion 91.

A second width K as the width (the transverse length) of the protruding portion 86 is set to be greater than the collecting dimension T1 and smaller than the thickness D of the electrode assembly 14 (T1<K<D). As shown in FIG. 5, the second width K is the length of the insulating sheet 70 protruding from the upper end face 36 in the projecting direction of the tabs 41 and 42 (the protruding dimension K). The protruding dimension K is the length of the protruding portion 86 extending from the base portion 91. In other words, the protruding dimension K is the length of the protruding portion 86 in the direction orthogonal to the fifth boundary line B5 or the sixth boundary line B6.

The side-face covering portions 84 and 85 are each divided into three continuous parts by extended lines of the boundary lines B1 and B2. Describing in detail, the side-face covering portion 84 is divided into a first part 84a continuous with the primary-face covering portion 81, a second part 84b continuous with the primary-face covering portion 82, and a third part 84c continuous with the bottom-face covering portion 83. Similarly, the side-face covering portion 85 is divided into three parts 85a to 85c.

As shown in FIG. 3, the insulating sheet 70 is valley-folded along the boundary lines B1 to B4 to form a box having the bottom-face covering portion 83 as the bottom. The folding manner will be described below in detail in connection with a procedure of attaching the insulating sheet 70 to the electrode assembly 14.

Figure 6A:
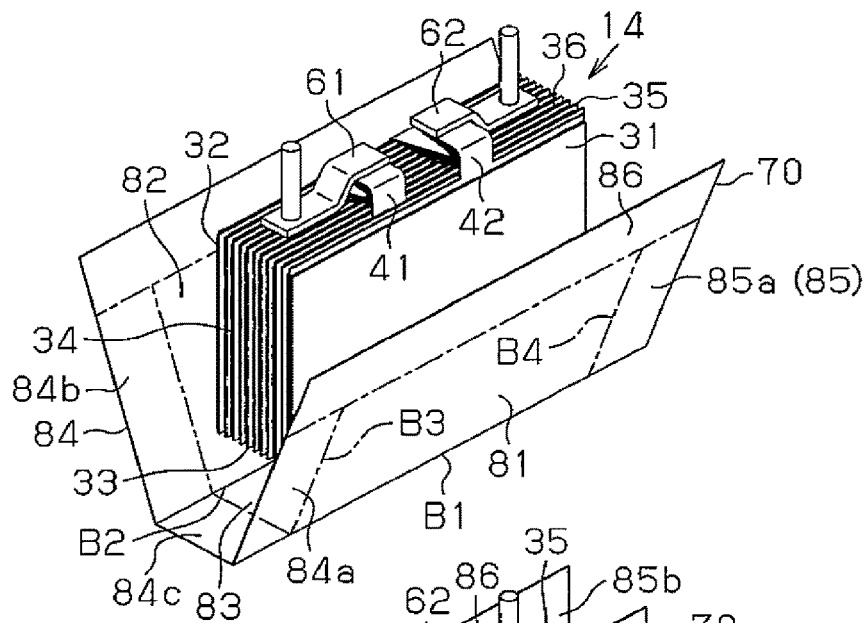
FIGS. 6A to 6C are diagrams showing a procedure of attaching the insulating sheet.

First, as shown in FIG. 6A, the insulating sheet 70 is attached to the electrode assembly 14 to enclose the electrode assembly 14 from the side corresponding to the bottom face 33. Describing in detail, the insulating sheet 70 is attached such that the bottom-face covering portion 83 overlaps the bottom face 33. Then, the insulating sheet 70 is folded along the first boundary line B1 and the second boundary line B2. Thereby, both of the primary faces 31 and 32 in the stacking direction of the electrode assembly 14 are covered with the primary-face covering portions 81 and 82, respectively.

Figure 6B:
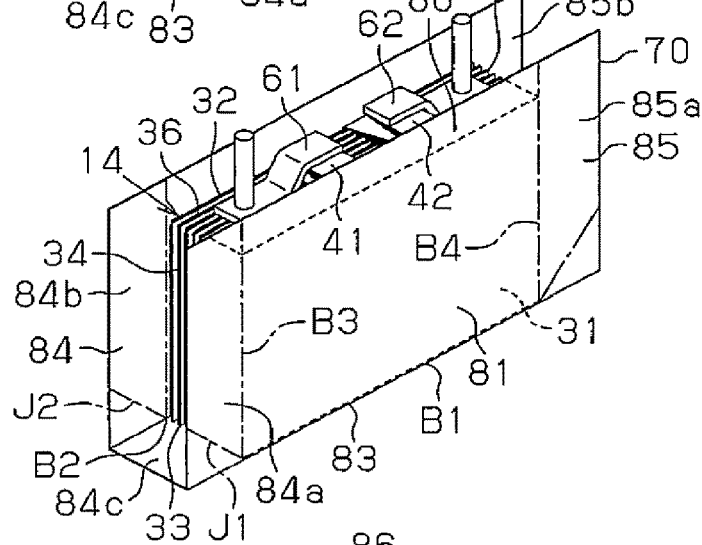
Figure 6C:
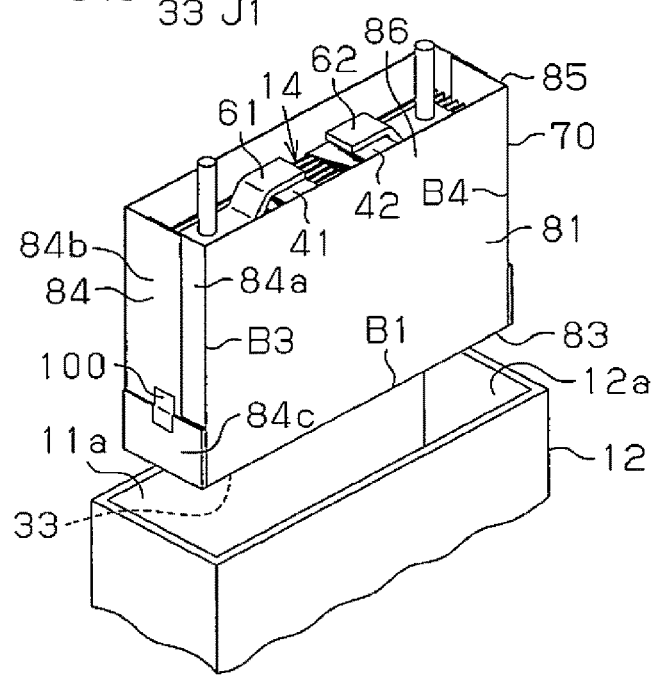

After that, as shown in FIG. 6B, the insulating sheet 70 is folded along the boundary lines B3 and B4. Thereby, the both side faces 34 and 35 of the electrode assembly 14 are covered with the side-face covering portions 84 and 85, respectively. In this case, as shown in FIG. 6C, in the side-face covering portion 84, the insulating sheet 70 (parts of the side-face covering portion 84) is partially overlapped. Describing in detail, the first part 84a and the second part 84b partially overlap each other, and the parts 84a to 84c partially overlap in the side-face covering portion 84 on the side of the bottom-face covering portion 83.

The overlapping manner of the parts 84a to 84c will be described in detail. As shown in FIG. 4, in the insulating sheet 70 in the spread state, a first folding line J1 extending from a first intersection of the first boundary line B1 and the third boundary line B3 obliquely (for example, at forty-five degrees relative to the first boundary line B1), and a second folding line J2 extending from a second intersection of the second boundary line B2 and the third boundary line B3 obliquely (for example, forty-five degrees relative to the second boundary line B2) are set. The folding lines J1 and J2 extend obliquely to be gradually away from the respective intersections. As shown in FIGS. 3 and 6B, the insulating sheet 70 is folded along the folding lines J1 and J2 and the third boundary line B3. In this case, the parts 84a to 84c overlap one another in the state where the third part 84c is arranged on the outermost layer and falls within the side-face covering portion 84. The same applies to the parts 85a to 85c of the side-face covering portion 85.

After that, as shown in FIG. 6C, a fixing tape 100 is affixed to bridge the overlapping area of the parts 84a to 84c and the second part 84b. Then, the electrode assembly 14 enclosed with the insulating sheet 70 is inserted into the container 12 from the bottom face 33 to be housed in the container 12. This prevents a short circuit between respective faces 31-35 except for the upper end face 36 of the electrode assembly 14 and the container 12.

Operation of the present embodiment will now be described.

As shown in FIGS. 4 to 6, the box-like insulating sheet 70 is formed by folding the rectangular sheet along the boundary lines B1 to B4 and the folding lines J1 and J2, and the electrode assembly 14 is housed in the box-like insulating sheet 70. In this case, the primary-face covering portions 81 and 82 are continuous with the adjacent non-primary-face covering portions (the bottom-face covering portion 83 and the side-face covering portions 84 and 85). For this reason, no gap is formed in the boundaries of the portions 81 to 85 of the insulating sheet 70, which covers the faces 31 to 35 of the electrode assembly 14, to improve the insulation.

The side-face covering portion 84 (the parts 84a to 84c) partially overlap each other. That is, the side-face covering portion 84 is configured by allowing the parts 84a to 84c to overlap each other. Thus, the side-face covering portion 84 is unlikely to have a gap from which the side face 34 of the electrode assembly 14 is exposed.

The parts 84a to 84c constituting the side-face covering portion 84 fall within the side-face covering portion 84 without parts thereof protruding beyond the side-face covering portion 84. Thus, when the electrode assembly 14 is housed in the case 11, the insulating sheet 70 does not become an obstacle.

In particular, if the parts 84a to 84c partially protrude toward the primary-face covering portions 81 and 82, bulging portions projecting further than other portions are formed on the primary-face covering portions 81 and 82, and a local load is applied to each of the bulging portions. Then, the opposed regions 24 may be subjected to the local load, leading to disadvantages such as the precipitation of lithium. In contrast, since the parts 84a to 84c are folded to fall within the side-face covering portion 84 in the present embodiment, such disadvantages are unlikely to occur.

Since the first width W is set to be smaller than the thickness D of the electrode assembly 14, when the insulating sheet 70 is folded along the third boundary line B3, the first part 84a and the second part 84b do not protrude outward in the stacking direction from the primary-face covering portions 81 and 82. This eliminates the necessity of further folding the first part 84a and the second part 84b.

In particular, the outermost layer of the overlapping area of the parts 84a to 84c in the side-face covering portion 84 on the side of the bottom-face covering portion 83 becomes the third part 84c, which is continuous with the bottom-face covering portion 83 located on the insertion side of the electrode assembly 14 enclosed with the insulating sheet 70. As a result, the bottom-face covering portion 83 is continuous with the overlapping area, and ends of the parts 84a to 84c are not exposed when viewed from the direction opposite to the inserting direction. Thus, at insertion, the overlapping area of the parts 84a to 84c is unlikely to be caught.

The protruding portion 86, which protrudes from the upper end face 36 of the electrode assembly 14 in the projecting direction of the tabs 41 and 42, is located between the tabs 41 and 42 and the conductive members 61 and 62, and the case 11. This improves the insulation between the tabs 41 and 42, the conductive members 61 and 62, and the case 11. In particular, the protruding dimension K is set to be greater than the collecting dimension T1. For this reason, the tabs 41 and 42, and the conductive members 61 and 62 (connection structure of the electrode assembly 14 and the terminals 51 and 52) are wholly surrounded with the protruding portion 86. This further improves the insulation of the connection structure from the case 11.

The present embodiment achieves the following advantages.

(1) The insulating sheet 70 is provided through folding, which is shaped like a box with a bottom, covers the faces 31 to 35 of the electrode assembly 14 except for the upper end face 36, and has the continuous portions 81 to 85. Thus, no gap is formed in the boundaries of the portions 81 to 85, improving the insulation.

The insulating sheet 70 includes the side-face covering portions 84 and 85, which cover both side faces 34 and 35 as two end faces orthogonal to both of the primary faces 31 and 32 among the faces 31 to 36 of the electrode assembly 14 in the stacking direction of the electrode assembly 14, and the upper end face 36 on which the tabs 41 and 42 are formed (and the bottom face 33 on the side opposite to the upper end face 36). In the side-face covering portion 84, the parts 84a to 84c, which constitute the side-face covering portion 84, partially overlap each other. As a result, a gap from which the side face 34 of the electrode assembly 14 is exposed is unlikely to be formed in the side-face covering portion 84. This further improves the insulation.

In particular, the insulating sheet 70 is folded such that the parts 84a to 84c fall within the side-face covering portion 84. This prevents disadvantages caused by the protrusion of a part of the insulating sheet 70 from the primary-face covering portions 81 and 82 toward the outer side in the stacking direction, for example, a local load on the opposed regions 24. The same applies to the side-face covering portion 85.

(2) The insulating sheet 70 in the spread state is rectangular. This improves the insulation without any special processing such as cutting of the insulating sheet 70. This also simplifies manufacturing of the insulating sheet 70, enabling use of versatile products.

(3) Further, since the box-like insulating sheet 70 with a bottom is formed by folding, the boundaries of the parts 84a to 84c are seamless, which prevents the formation of a gap. This further improves the insulation.

(4) Given that the length of the extending portion of the side-face covering portion 84 from the base portion 91 is W, and the thickness of the electrode assembly 14 is D, a relationship of D/2<W<D holds. Thus, when the side-face covering portion 84 is folded along the third boundary line B3, parts of the side-face covering portion 84 (the parts 84a to 84c) overlap. Therefore, the box-like insulating sheet 70 having good insulation can be formed relatively easily.

(5) The insulating sheet 70 is folded such that the third part 84c, which is continuous with the bottom-face covering portion 83, becomes the outermost layer. The bottom-face covering portion 83 covers the bottom face 33, which is the face of the side to which the electrode assembly 14 is inserted. Thus, insertion of the electrode assembly 14 into the container 12 is unlikely to be inhibited by the overlapping area of the insulating sheet 70. For this reason, it is possible to prevent the situation in which insertion of the electrode assembly 14 is inhibited due to partial overlapping of the insulating sheet 70.

(6) The insulating sheet 70 includes the protruding portion 86, which projects from the upper end face 36 in the projecting direction of the tabs 41 and 42 and surrounds the tabs 41 and 42 and the conductive members 61 and 62. The protruding portion 86 is located between the case 11 and the set of the tabs 41 and 42 and the conductive members 61 and 62. This prevents a short circuit therebetween. The use of a member for insulating the electrode assembly 14 from the case 11 favorably restrains a short circuit between the tabs 41 and 42 and the conductive members 61 and 62, and the case 11. In particular, the protruding dimension K is set to be greater than the collecting dimension T1. Thereby, the whole of the tabs 41 and 42 and the parts 61a and 62a are surrounded with the protruding portion 86, which improves the insulation.

Second Embodiment

Figure 10:
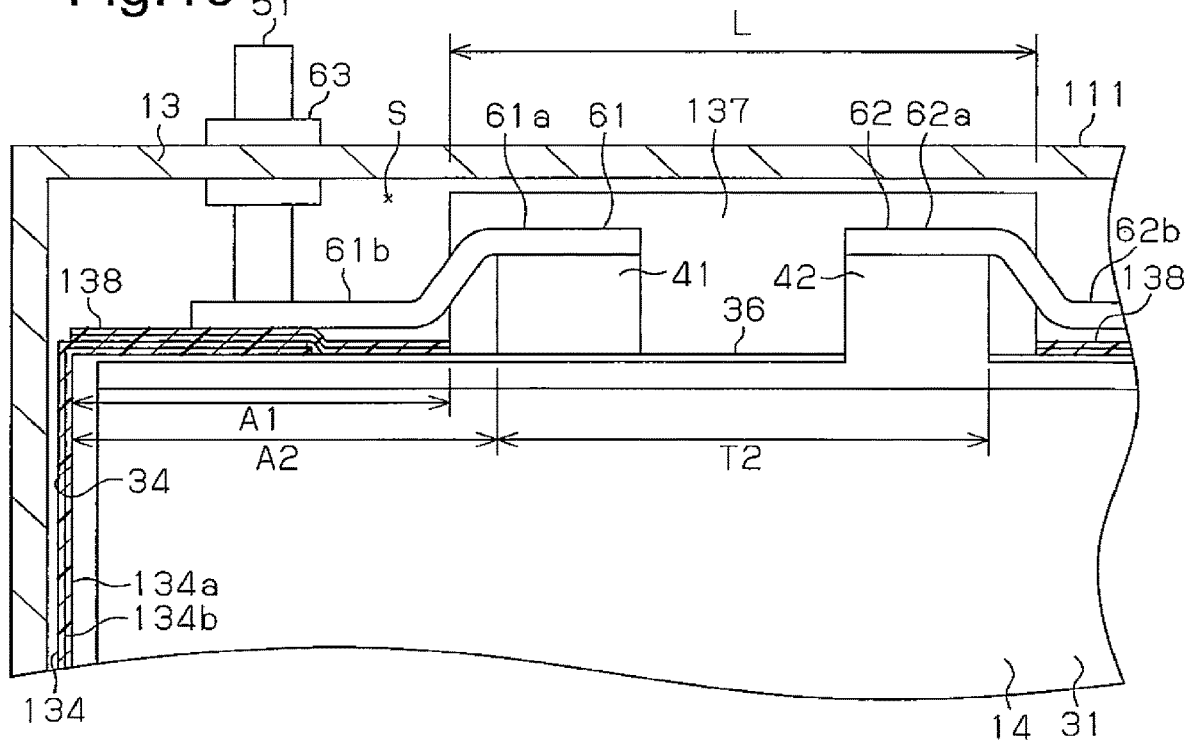
FIG. 10 is a schematic view of a cross-sectional structure of the rechargeable battery.

A second embodiment is different from the first embodiment in the configuration of the case and the insulating sheet. The differences will be described below. The same components as those in the first embodiment are given the same reference numerals and description thereof is omitted. FIG. 10 shows a case 111 and an insulating sheet 120 in a cross-sectional view and other components in a front view.

Figure 7:
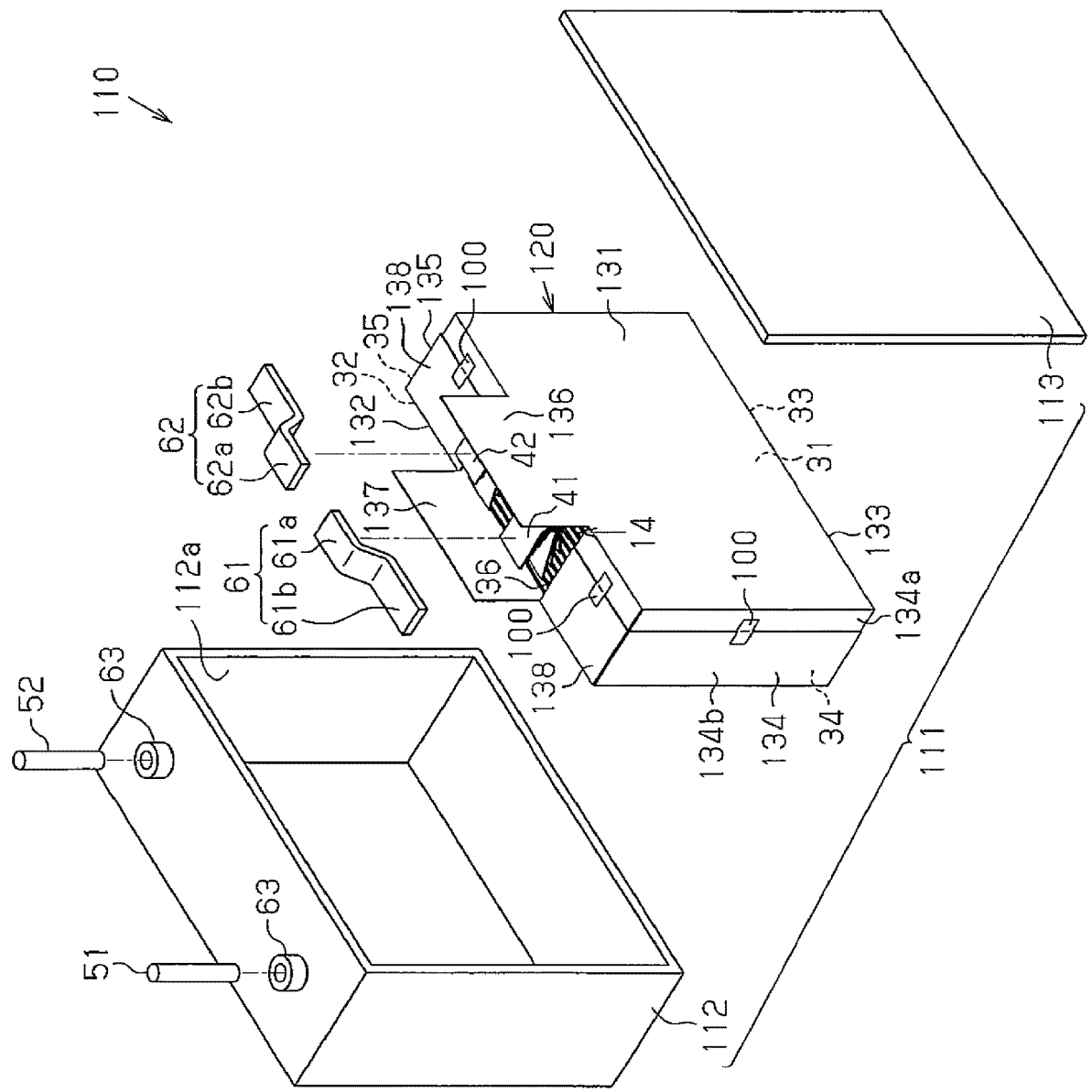
FIG. 7 is an exploded perspective view of a rechargeable battery according to a second embodiment.

As shown in FIG. 7, the case 111 of a rechargeable battery 110 in the present embodiment includes a container 112 having an opening 112a into which the electrode assembly 14 with the tabs 41 and 42 is inserted from the primary face 32 of the electrode assembly 14 in the stacking direction, and a lid 113 that closes the opening 112a. The electrode assembly 14 is inserted into the container 112 from the primary face 32 via the opening 112a in the state where the tabs 41 and 42 are welded to the conductive members 61 and 62, respectively, thereby being housed in the container 112. The terminals 51 and 52 are attached after the insertion of the electrode assembly 14 into the container 112.

As shown in FIG. 7, as in the first embodiment, the insulating sheet 120 in the present embodiment is shaped like a box with a bottom, and includes primary-face covering portions 131 and 132 that cover both of the primary faces 31 and 32 of the electrode assembly 14 in the stacking direction, a bottom-face covering portion 133 that covers the bottom face 33 of the electrode assembly 14, and side-face covering portions 134 and 135 that cover both of the side faces 34 and 35 of the electrode assembly 14.

The insulating sheet 120 in the present embodiment includes protruding portions 136 and 137 protruding from the upper end face 36 of the electrode assembly 14 in the projecting direction of the tabs 41 and 42. The protruding portions 136 and 137 have the same shape, and are opposed to each other with the tabs 41 and 42 and the conductive members 61 and 62 in between. In this case, as shown in FIG. 10, a length L of the protruding portion 137 in the longitudinal direction (the direction orthogonal to the projecting direction of the tabs 41 and 42) is greater than a length T2 of the area where the tabs 41 and 42 are arranged in the same direction (the length from the upper end of the positive-electrode tab 41 to the upper end of the negative-electrode tab 42). For this reason, the tabs 41 and 42 are wholly arranged between the protruding portions 136 and 137. The protruding dimension K of the protruding portions 136 and 137 (see FIG. 8) is the same as that in the first embodiment.

The insulating sheet 120 includes a top-face covering portion 138 that covers a part of the upper end face 36 of the electrode assembly 14, in particular, the area other than the tabs 41 and 42. As shown in FIG. 10, the top-face covering portion 138 is located between the second positive-electrode part 61b and the electrode assembly 14, and is located between the second negative-electrode part 62b and the electrode assembly 14.

Next, the folding manner of the insulating sheet 120, and the protruding portions 136 and 137 and the top-face covering portion 138 will be described with reference to the spread insulating sheet 120.

Figure 8:
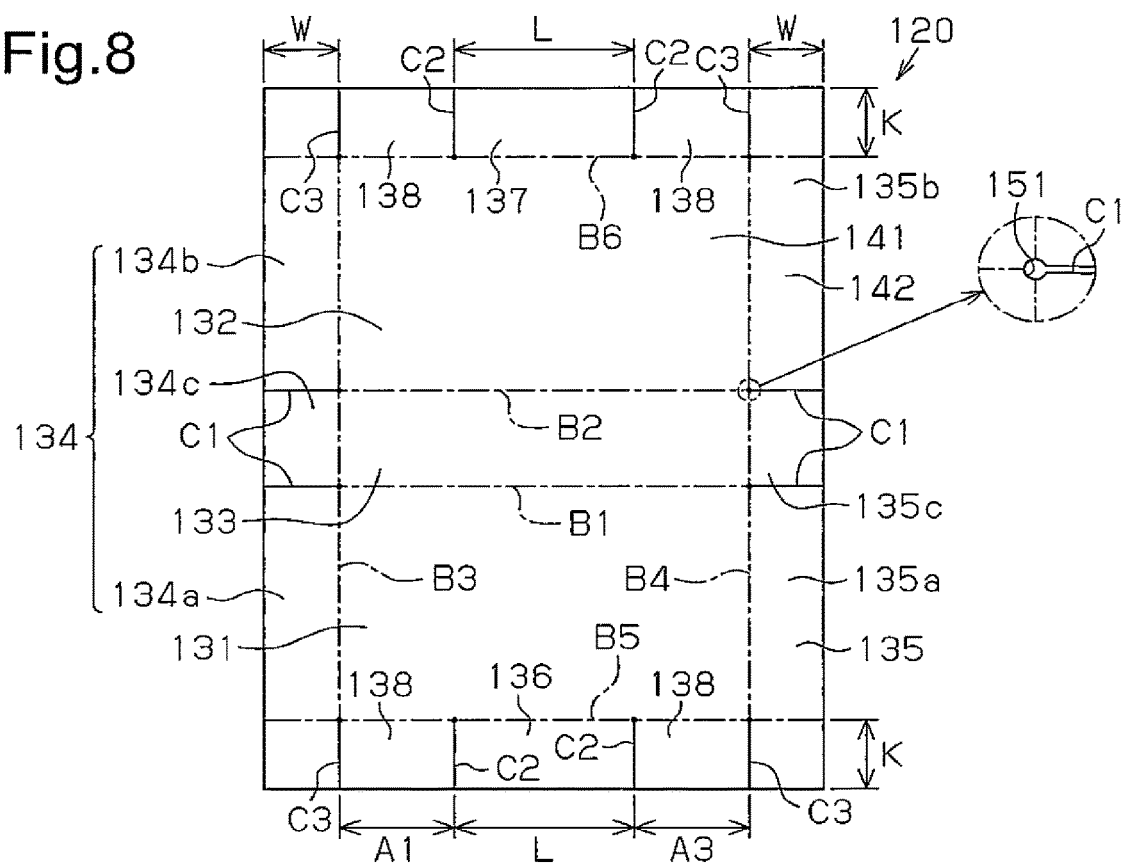
FIG. 8 is a front view and a partial enlarged view of a spread insulating sheet in the second embodiment.

As shown in FIG. 8, the spread shape of the insulating sheet 120 in the present embodiment is the same as that of the insulating sheet 70 in the first embodiment. The insulating sheet 120 includes a base portion 141 configured of the primary-face covering portions 131 and 132 and the bottom-face covering portion 133, and an extending portion 142 configured of the side-face covering portions 134 and 135, the protruding portions 136 and 137, and the top-face covering portion 138. The shape of the portions 131 to 135 is the same as the portions 81 to 85 of the insulating sheet 70 in the first embodiment and thus, detailed description thereof is omitted.

The protruding portions 136 and 137 and the top-face covering portion 138 are portions protruding from the base portion 141 and the side-face covering portions 134 and 135 along long sides of the base portion 141 in the insulating sheet 120. In this case, the width (the length in the extending direction) of the top-face covering portion 138 is the same as the protruding dimension K of the protruding portions 136 and 137.

As shown in FIG. 8, the insulating sheet 120 has a plurality of incisions C1 to C3. Describing in detail, the side-face covering portions 134 and 135 have first incisions C1 cut from the ends of the boundary lines B1 and B2 along extended lines of the first boundary line B1 and the second boundary line B2 by the first width W. In the spread state, the side-face covering portion 134 is divided into parts 134a to 134c by the first incisions C1, and the parts can be individually folded. The side-face covering portion 135 is similarly divided into parts 135a to 135c by the first incisions C1.

The insulating sheet 120 has second incisions C2 for separating the protruding portions 136 and 137 from the top-face covering portion 138. Describing the side of the protruding portion 136 in detail, as shown in FIG. 8, the two second incisions C2 are formed at an interval of the longitudinal length L of the protruding portion 136. The second incisions C2 protrude from the fifth boundary line B5 in the direction orthogonal to the fifth boundary line B5 by the protruding dimension K. Thus, the protruding portion 136 and the top-face covering portion 138 can be individually folded. On the side of the protruding portion 137, the protruding portion 137 and the top-face covering portion 138 can also be folded along the second incisions C2.

The insulating sheet 120 in the spread state has third incisions C3 cut along extended lines of the third boundary line B3 and the fourth boundary line B4 by the protruding dimension K. Thus, in the top-face covering portion 138, portions continuous with the primary-face covering portions 131 and 132 and portions continuous with the side-face covering portions 134 and 135 can be individually folded.

As shown in a partial enlarged view of FIG. 8, bottom ends (in particular, the ends on the side corresponding to the base portion 141) of the incisions C1 to C3 each have a hole 151. The hole 151 protrudes toward the base portion 141 in a curved shape, and, in particular, is circular. A diameter of the hole 151 is greater than the width of each of the incisions C1 to C3.

Figure 9A:
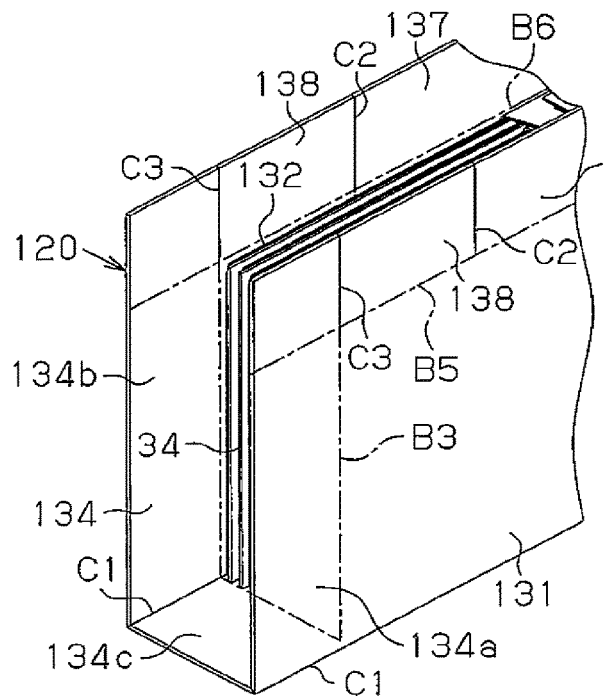
FIGS. 9A and 9B are diagrams showing a procedure of attaching the insulating sheet.
Figure 9B:
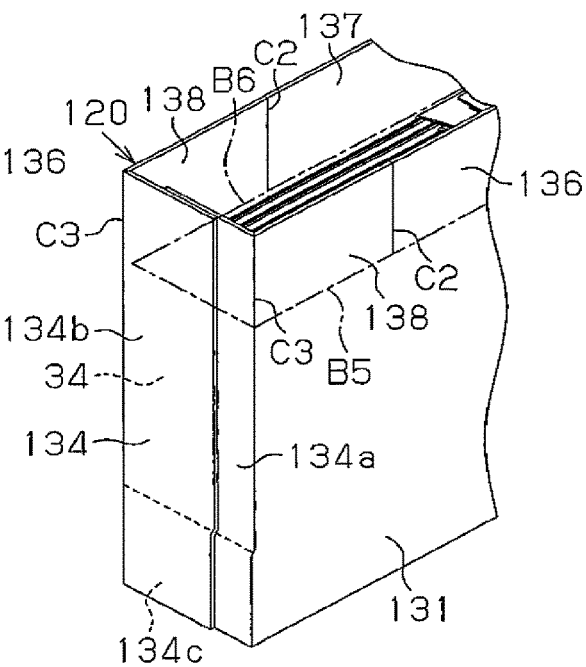

Next, describing the folding manner of the insulating sheet 120 in the present embodiment, as shown in FIGS. 9A and 9B, the side-face covering portion 134 is formed by being sequentially folded along the third boundary line B3 in the order of the third part 134c, the first part 134a, and the second part 134b. In this case, the second part 134b continuous with the primary-face covering portion 132 becomes the outermost layer, and the parts 134a to 134c overlap each other. Similarly for the side-face covering portion 135, the parts 135a to 135c are folded such that the second part 135b continuous with the primary-face covering portion 132 becomes the outermost layer.

As shown in FIG. 9B, the top-face covering portion 138 is formed by being sequentially folded along the boundary lines B5 and B6 in the order of the part continuous with the side-face covering portion 134, the part on the side corresponding to the protruding portion 136, and the part on the side corresponding to the protruding portion 137.

As shown in FIG. 7, a fixing tape 100 is affixed to bridge the first part 134a and the second part 134b, which constitute the side-face covering portion 134. Similarly, a fixing tape (not shown) is affixed to the side-face covering portion 135. The fixing tape 100 is also affixed to bridge the ends of parts constituting the top-face covering portion 138. Thereby, the insulating sheet 120 is attached to the electrode assembly 14 while being restricted in displacement.

The second incisions C2 are positioned such that the protruding portions 136 and 137 sandwich the tabs 41 and 42 therebetween in the stacking direction when the electrode assembly 14 is housed in the box-like insulating sheet 120. Describing in detail, as shown in FIGS. 8 and 10, a distance A1 between the third incisions C3 and the second incisions C2 on the side of the side-face covering portion 134 is smaller than a distance A2 between the boundary of the upper end face 36 and the side face 34 covered with the side-face covering portion 134, and the positive-electrode tab 41. Similarly, a distance A3 between the third incisions C3 and the second incisions C2 on the side of the side-face covering portion 135 is smaller than the distance (not shown) between the boundary of the upper end face 36 and the side face 35 covered with the side-face covering portion 135, and the negative-electrode tab 42.

Operation of the present embodiment will now be described.

As shown in FIG. 8, since the side-face covering portion 134 has the first incisions C1, in the insulating sheet 120 in the spread state, the parts 134a to 134c can be individually folded. Thus, it is no need to fold the sheet along the folding lines J1 and J2 in the first embodiment. As a result, the folding operation is simplified, and the number of overlapping layers is reduced.

In particular, the bottom ends of the incisions C1 to C3 each have the curved hole 151 protruding toward the base portion 141. Thereby, in folding of the insulating sheet 120, a local load on each of the bottom ends of the incisions C1 to C3 can be suppressed.

As shown in FIG. 7, the top-face covering portion 138 is folded along the boundary lines B5, B6 to cover the upper end face 36 of the electrode assembly 14, and the protruding portions 136 and 137 protrude in the projecting direction of the tabs 41 and 42 without being folded to prevent contact of the tabs 41 and 42 with the case 111.

In particular, as described in the first embodiment, the protruding dimension K, the thickness D of the electrode assembly 14, and the collecting dimension T1 are set to satisfy a relationship of T1<K<D. For this reason, the protruding portions 136 and 137 are located between the tabs 41 and 42 and the case 111. In other words, when viewed from the stacking direction of the electrode assembly 14, the tabs 41 and 42 are covered with the protruding portions 136 and 137. Since the length of the top-face covering portion 138 in the extending direction is the same as the protruding dimension K, the length is less than the thickness D of the electrode assembly 14. For this reason, even when the parts of the top-face covering portion 138 are folded, the parts do not protrude outward in the stacking direction from the primary-face covering portions 131 and 132.

The insulating sheet 120 overlaps such that the part continuous with the primary-face covering portion 82 becomes the outermost layer. The primary-face covering portion 82 covers the primary face 32 to which the electrode assembly 14 is inserted in the stacking direction of the electrode assembly 14. Thus, in the configuration in which the insulating sheet 120 encloses the electrode assembly 14, the ends of the parts 134a to 134c are not exposed when viewed from the direction opposite to the inserting direction. Therefore, at insertion of the electrode assembly 14, the overlapping area of the insulating sheet 120 does not become an obstacle.

In addition to the above described advantages (1), (2), (4), and (5), the present embodiment achieves the following advantages.

(7) The insulating sheet 120 has the first incisions C1 such that the parts 134a to 134c constituting the side-face covering portion 134 can be individually folded. As a result, the side-face covering portion 134 can be easily folded, and the number of overlapping layers is reduced.

(8) The hole 151 is formed in each of the bottom ends of the incisions C1 to C3. This can suppress a local load from onto each bottom end. In particular, the hole 151 is a circle having a greater diameter than the cutting width. Thereby, the area (the circumference) subjected to stress can be increased, which further disperses the stress.

Since the dimension of each of the incisions C1 to C3 is set to be the same as the first width W or the protruding dimension K, when the insulating sheet 120 is shaped like a box, gaps are formed at corners of the box due to the holes 151. However, the gaps are so small that the contact of the electrode assembly 14 with the case 111 through the gaps is difficult or impossible. For this reason, the insulating sheet 120 ensures insulation between the electrode assembly 14 and the case 111. That is, "box that covers faces other than the upper end face and both end faces of the electrode assembly" does not necessarily mean the completely covered state, but includes a structure in which gaps are formed at corners of the box while ensuring insulation between the case 111 and the electrode assembly 14.

(9) The protruding portions 136 and 137 opposed to each other via the tabs 41 and 42, and the top-face covering portion 138 that covers the upper end face 36 except for the tabs 41 and 42 are provided. This ensures insulation between the tabs 41 and 42 and the case 111 and insulation between the electrode assembly 14 and the conductive members 61, 62.

In particular, the second positive-electrode part 61b and the second negative-electrode part 62b are located closer to the upper end face 36 than the first positive-electrode part 61a and the first negative-electrode part 62a in the space S so as not to generate a dead space (the space between the second positive-electrode part 61b and the second negative-electrode part 62b, and the upper end face 36). For this reason, the second positive-electrode part 61b and the second negative-electrode part 62b easily contact the upper end face 36. In contrast, in the present embodiment, the top-face covering portion 138 restricts contact of the second positive-electrode part 61b and the second negative-electrode part 62b with the upper end face 36. This reduces the dead space while suppressing the contact.

(10) In the insulating sheet 120 in the spread state, the protruding portions 136 and 137, and a part of the top-face covering portion 138 are portions extending along the long sides of the base portion 141. With such a configuration, the second incisions C2 for partitioning the portions are formed. Thereby, these portions can be individually folded. Therefore, the above-mentioned advantage (9) is achieved using the rectangular insulating sheet 120.

(11) The protruding dimension K (and the length of the top-face covering portion 138 in the extending direction), the thickness D of the electrode assembly 14, and the collecting dimension T1 are set to satisfy the relationship of T1<K<D. Thus, even when the top-face covering portion 138 is folded, the parts constituting the top-face covering portion 138 can be prevented from protruding outward in the stacking direction of the primary-face covering portions 131 and 132 while improving the insulation between the tabs 41 and 42 and the case 111 with the protruding portions 136 and 137.

Third Embodiment

A third embodiment is different from the former embodiments in the configuration of the insulating sheet. The difference will be described with reference to FIGS. 11 and 12.

Figure 12:
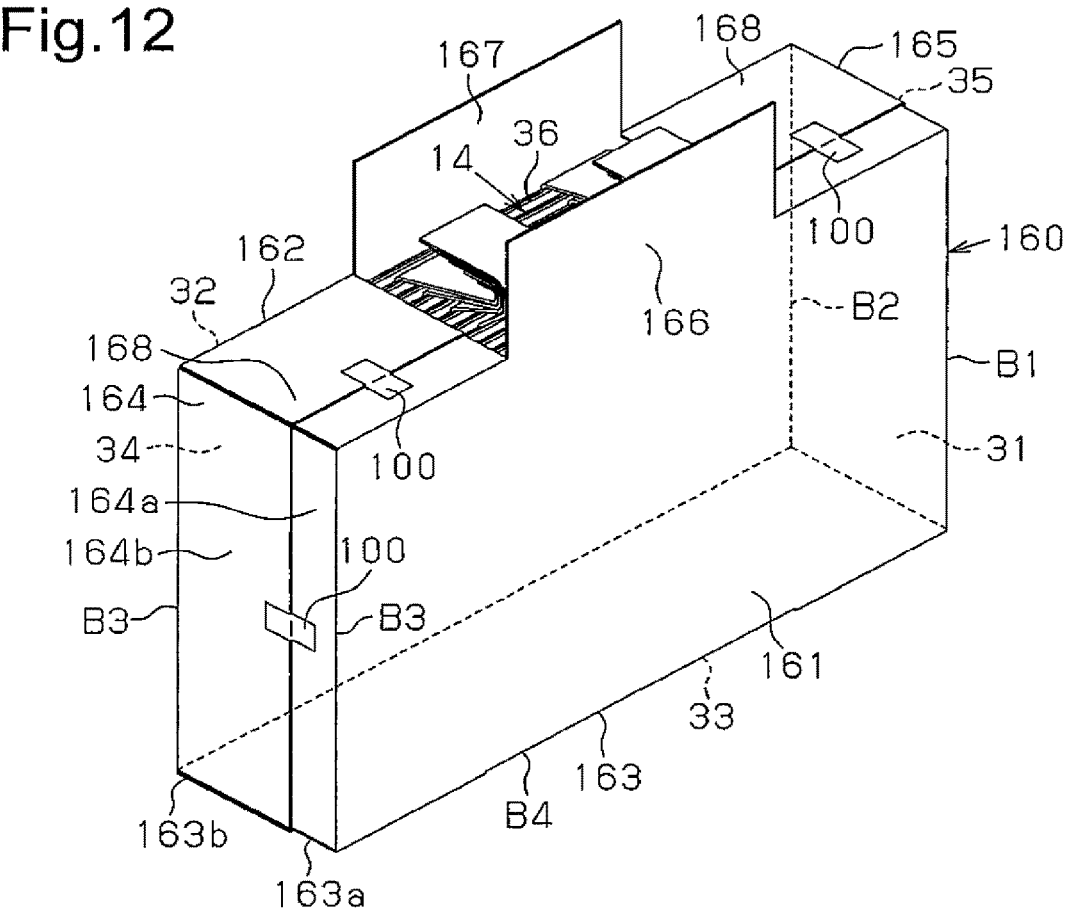
FIG. 12 is a perspective view showing the manner of attaching the insulating sheet in the third embodiment.

As shown in FIG. 12, an insulating sheet 160 includes primary-face covering portions 161 and 162 that cover both primary faces 31 and 32 in the stacking direction of the electrode assembly 14, respectively, a bottom-face covering portion 163 that covers the bottom face 33 of the electrode assembly 14, and side-face covering portions 164 and 165 that cover both side faces 34 and 35 of the electrode assembly 14, respectively. The insulating sheet 160 further includes protruding portions 166 and 167 that protrude from the upper end face 36 of the electrode assembly 14 and are opposed to each other so as to sandwich the tabs 41 and 42 therebetween, and a top-face covering portion 168 that covers an area of the upper end face 36 except for the tabs 41 and 42.

Figure 11:
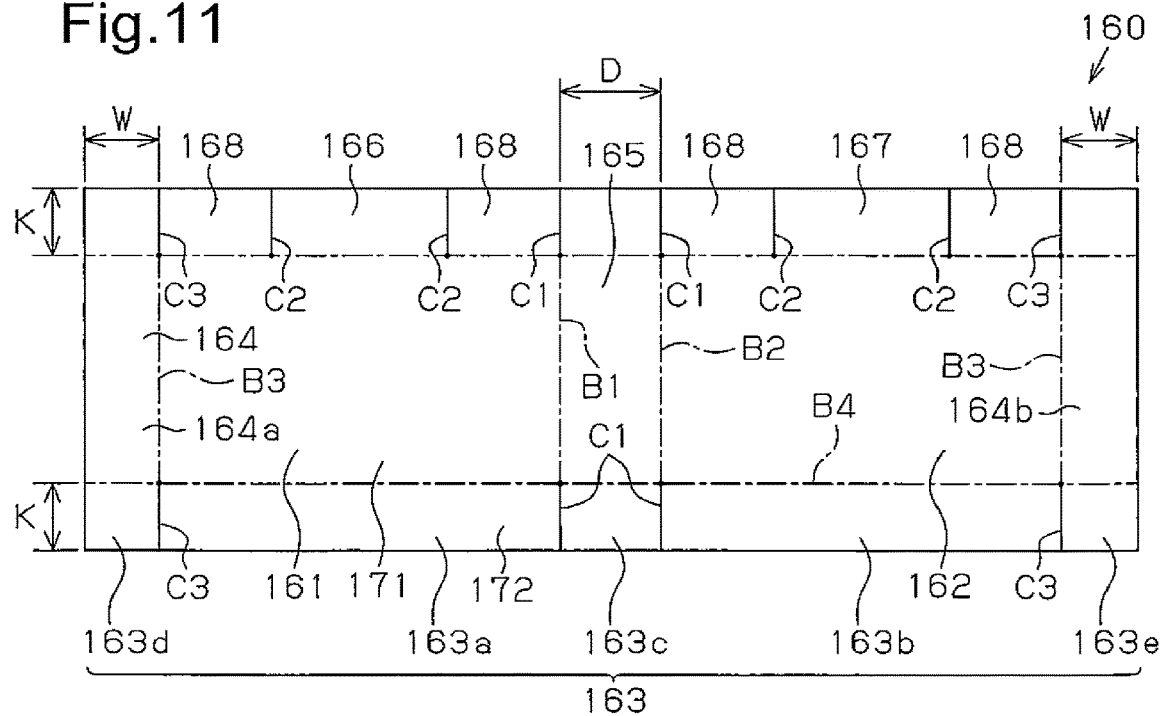
FIG. 11 is a front view of a spread insulating sheet according to a third embodiment.

Describing the spread shape of the insulating sheet 160, as shown in FIG. 11, the primary-face covering portions 161 and 162 and the side-face covering portion 165 constitute a rectangular base portion 171. In this case, the primary-face covering portion 161 is continuous with the side-face covering portion 165 via the first boundary line B1, and the primary-face covering portion 162 is continuous with the side-face covering portion 165 via the second boundary line B2. A transverse length of the side-face covering portion 165 is set to be the same as the thickness D of the electrode assembly 14.

As shown in FIG. 11, the bottom-face covering portion 163, the side-face covering portion 164, the protruding portions 166 and 167, and the top-face covering portion 168 constitute an extending portion 172. Describing in detail, the side-face covering portion 164 is divided into two parts 164a and 164b extending from the primary-face covering portions 161 and 162, respectively, along long sides of the base portion 171. The bottom-face covering portion 163 is a portion extending from the base portion 171 and the side-face covering portion 164 along one short side of the base portion 171. The protruding portions 166 and 167 and the top-face covering portion 168 are portions extending from the base portion 171 and the side-face covering portion 164 along the other short side of the base portion 171. In this case, the side-face covering portion 164 is continuous with the primary-face covering portions 161 and 162 via the third boundary line B3, and the bottom-face covering portion 163 is continuous with the base portion 171 via the fourth boundary line B4. In the present embodiment, the side-face covering portion 165 corresponds to the first non-primary-face covering portion, and the bottom-face covering portion 163 corresponds to the second non-primary-face covering portion.

The width of the side-face covering portion 164 (the length in the extending direction) is set to be the first width W. Widths of the bottom-face covering portion 163, the protruding portions 166 and 167, and the top-face covering portion 168 (the length in the extending direction) are each set to be the protruding dimension K.

The insulating sheet 160 has first incisions C1 along extended lines of the first boundary line B1 and the second boundary line B2, second incisions C2 that partition the protruding portions 166 and 167, and the top-face covering portion 168, and third incisions C3 along an extended line of the third boundary line B3. The bottom-face covering portion 163 is divided into five parts 163a to 163e by the incisions C1 and C3.

As shown in FIG. 12, the insulating sheet 160 is attached to the electrode assembly 14 from the side face 35 such that the side face 35 of the electrode assembly 14 is covered with the side-face covering portion 165, and is folded along the boundary lines B1 to B4, to form a box that covers the faces 31 to 35 of the electrode assembly 14. In this case, the parts 164a and 164b constituting the side-face covering portion 164 partially overlap each other, and the parts 163a to 163e constituting the bottom-face covering portion 163 partially overlap each other. The fixing tape 100 is affixed over the overlapping area.

Operation of the present embodiment will now be described.

In the present embodiment, adjacent ones of the portions 161 to 165 in insulating sheet 160 are continuous with each other. The parts 164a and 164b constituting the side-face covering portion 164 partially overlap each other, and the parts 163a to 163e constituting the bottom-face covering portion 163 partially overlap each other. This prevents exposure of the faces 31 to 35 of the electrode assembly 14. The tabs 41 and 42 are sandwiched between the protruding portions 166 and 167, and a part of the upper end face 36 is covered with the top-face covering portion 168. This achieves the above-mentioned advantages (1), (2), (4), (8) to (11).

In the present embodiment, the widths of the bottom-face covering portion 163, the protruding portions 166 and 167 and the top-face covering portion 168 (the length in the extending direction) are each set to be the same value (the protruding dimension K). However, these widths may be different from one another in the range of values less than the thickness D of the electrode assembly 14.

Fourth Embodiment

A fourth embodiment is different from the former embodiments in the projecting length T0 of the positive-electrode tab 41 from the upper end face 36 and the collecting dimension T1. The difference will be described with reference to FIGS. 13 to 15.

Figure 13:
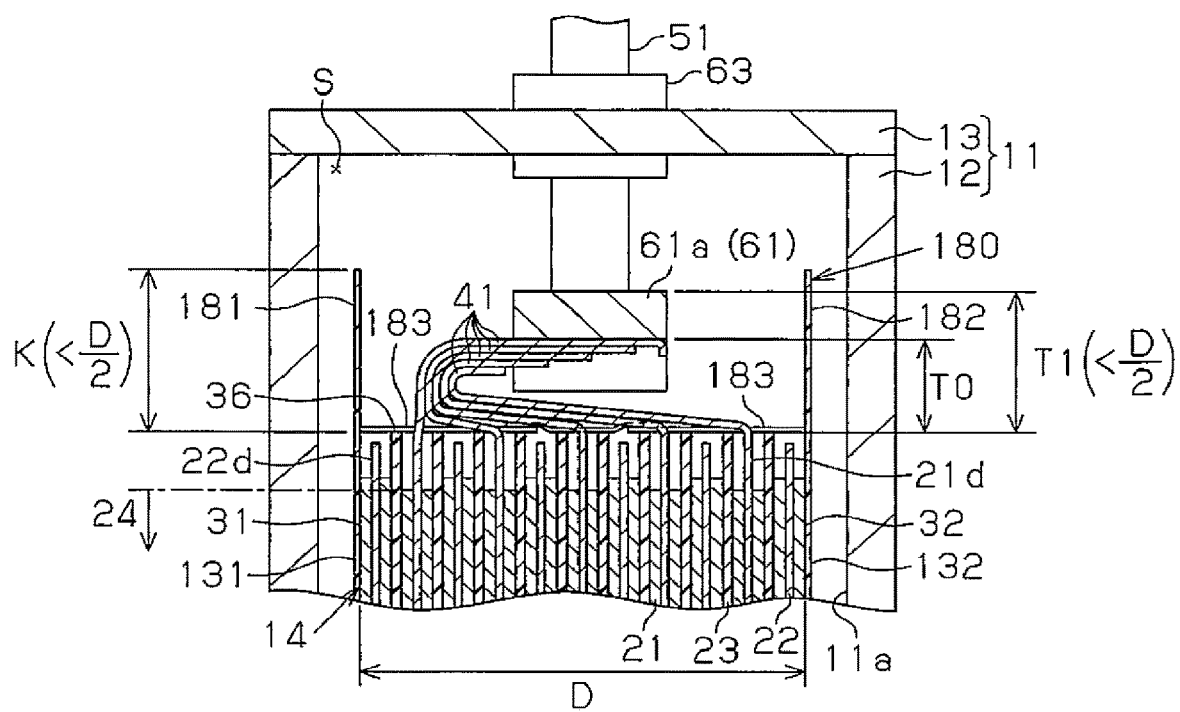
FIG. 13 is a partial cross-sectional view of a rechargeable battery according to a fourth embodiment.

As shown in FIG. 13, the projecting length T0 of each positive-electrode tab 41 from the upper end face 36 in the present embodiment is smaller than half the thickness D of the electrode assembly 14. The collecting dimension T1 that is the sum of the projecting length T0 of each positive-electrode tab 41 and the thickness of the first positive-electrode part 61a is smaller than half the thickness D of the electrode assembly 14. A protruding dimension K of an insulating sheet 180 in the present embodiment is greater than the projecting length T0 of each positive-electrode tab 41 from the upper end face 36 and the collecting dimension T1, and is smaller than half the thickness D of the electrode assembly 14. That is, a relationship of T0<T1<K<D/2 holds.

Figure 14:
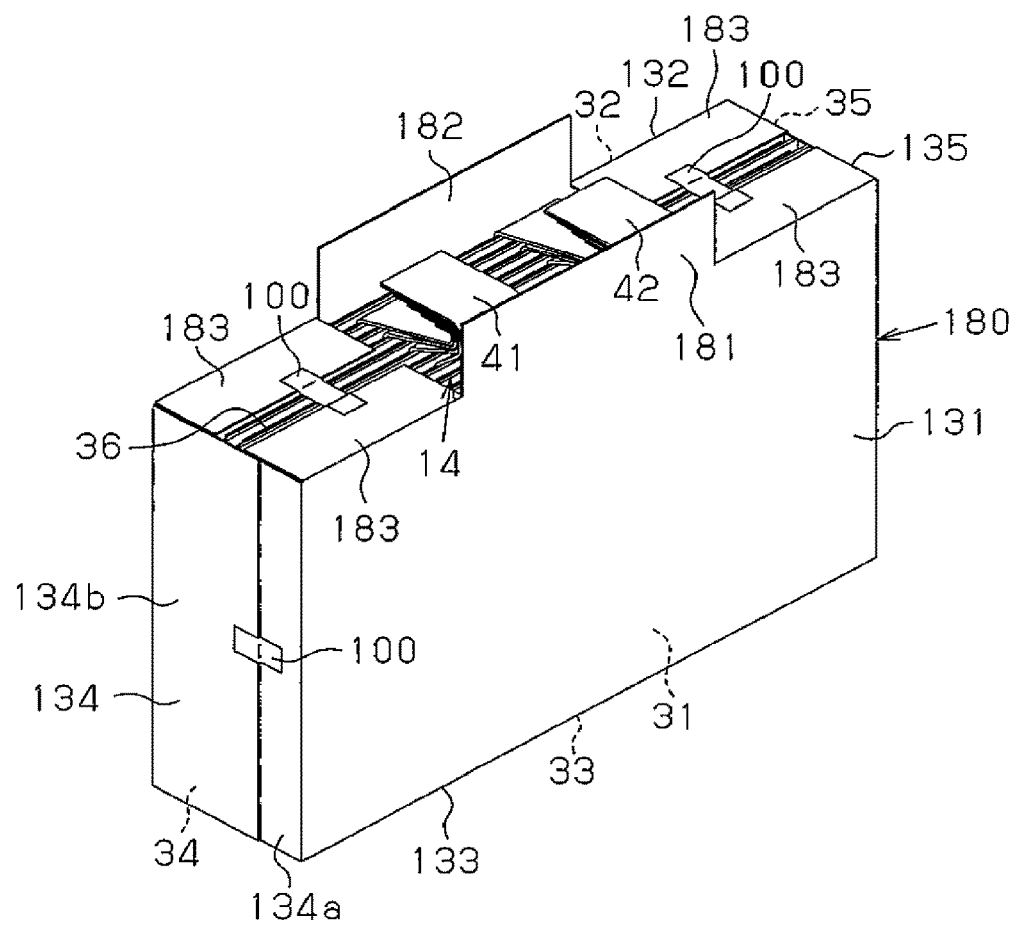
FIG. 14 is a perspective view of an electrode assembly and an insulating sheet.
Figure 15:
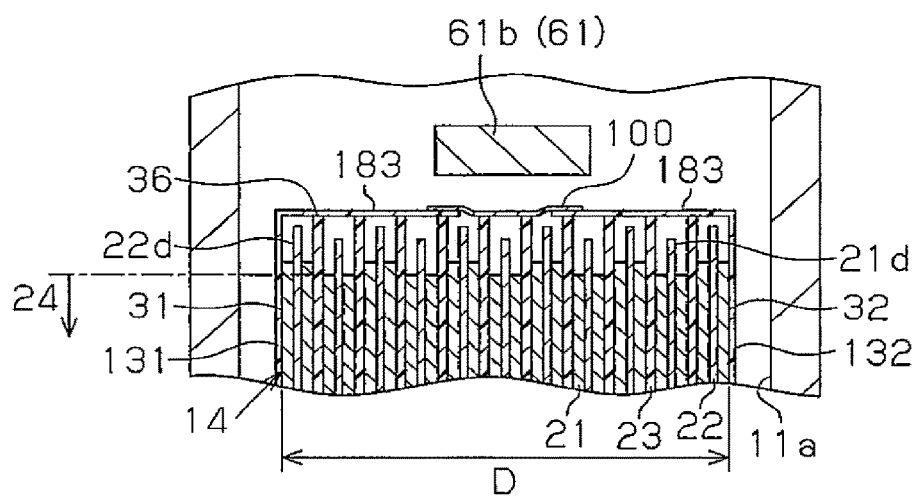
FIG. 15 is a partial cross-sectional view showing a manner of sticking a fixing tape.

With such a configuration, as shown in FIG. 14, the tabs 41 and 42 are located between protruding portions 181 and 182. A top-face covering portion 183 covers the upper end face 36 of the electrode assembly 14 without overlapping. In this case, the upper end face 36 of the electrode assembly 14 is partially exposed. As shown in FIG. 15, the fixing tape 100 is affixed to bridge the top-face covering portion 183 and the exposed area of the upper end face 36.

Operation of the present embodiment will now be described

In connection with T0<T1<D/2, the protruding dimension K is greater than the collecting dimension T1 and is smaller than half the thickness D of the electrode assembly 14. Thus, the insulating sheet 180 is smaller than the insulating sheet 70 having K>D/2 in the first embodiment.

Due to the relationship of K<D/2, the upper end face 36 of the electrode assembly 14 is partially exposed from the top-face covering portion 183. However, since the fixing tape 100 is affixed to bridge the exposed area of the upper end face 36 and the top-face covering portion 183, displacement of the insulating sheet 180 from the electrode assembly 14 is restricted.

In addition to the above described advantages (1), (2), (4), (5), and (7) to (10), the present embodiment achieves the following advantage.

(12) The relationship of T0<D/2 holds. Thus, as compared to the configuration of T0>D/2, the space for the tabs 41 and 42 is smaller, reducing the space for power collection structure.

With such a configuration, due to the relationship of K>T0, the insulating sheet 180 can be miniaturized while arranging the tabs 41 and 42 between the protruding portions 181 and 182, reducing costs for the insulating sheet 180.

In particular, the collecting dimension T1 including the projecting length T0 of the positive-electrode tab 41 from the upper end face 36 is set to be smaller than D/2, and the protruding dimension K is set to be greater than the collecting dimension T1 and smaller than D/2. Thus, the space for the tabs 41 and 42 and the conductive members 61 and 62 as the power collection structure is reduced, and insulation between these components and the case 11 is favorably ensured.

The fixing tape 100 is affixed to bridge the exposed area of the upper end face 36 of the electrode assembly 14 and the top-face covering portion 183. This limits displacement of the insulating sheet 180 from the electrode assembly 14 while miniaturizing the insulating sheet 180.

Fifth Embodiment

A fifth embodiment is different from the third embodiment in the folding manner of the insulating sheet 160 (see FIG. 11). This will be described below.

Figure 16:
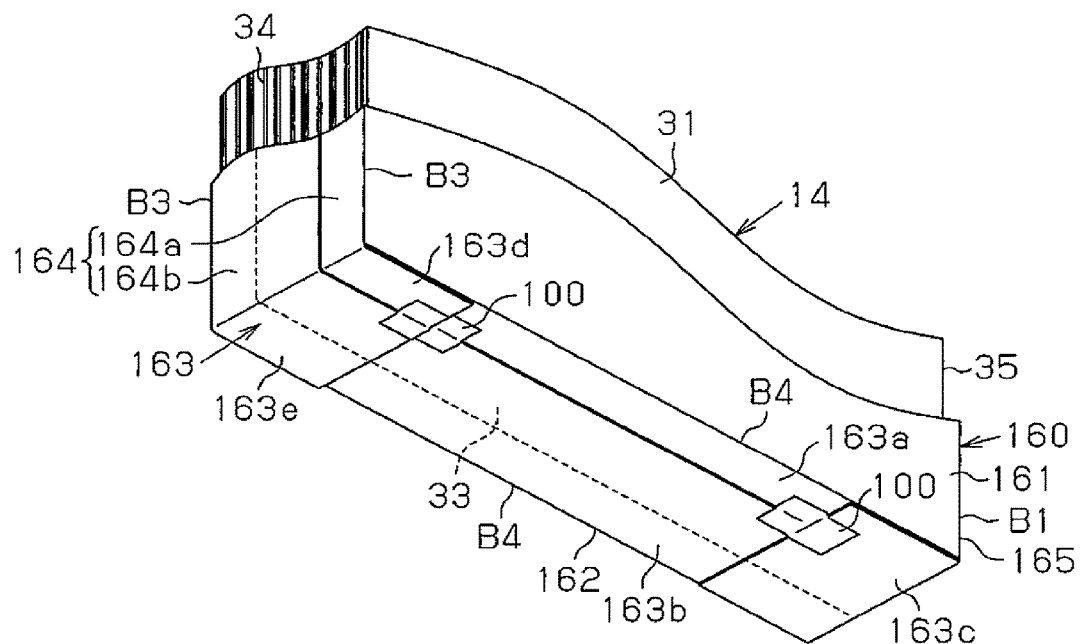
FIG. 16 is a perspective view of an electrode assembly and an insulating sheet according to a fifth embodiment.
Figure 17:
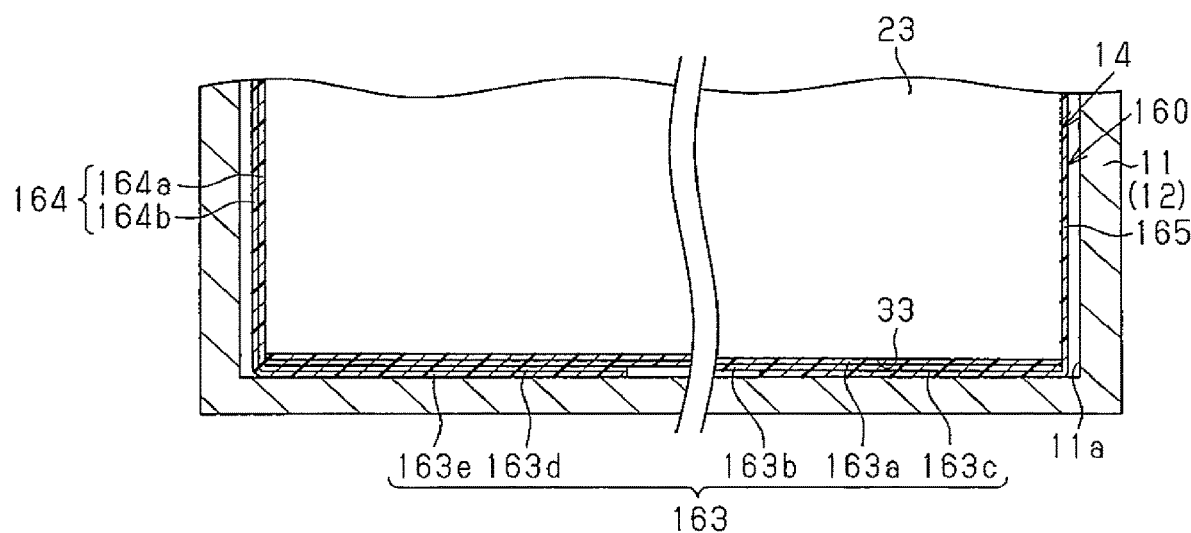
FIG. 17 is a cross-sectional view showing cross-sectional structures of the electrode assembly and the insulating sheet.

As shown in FIGS. 16 and 17, the insulating sheet 160 partially overlaps on the bottom face 33 of the electrode assembly 14. Describing in detail, the second part 163b continuous with the primary-face covering portion 162 overlaps the first part 163a continuous with the primary-face covering portion 161. At one longitudinal end of the bottom-face covering portion 163, the fourth part 163d and the fifth part 163e overlap the first part 163a and the second part 163b from the outer side. At the other longitudinal end of the bottom-face covering portion 163, the third part 163c overlaps the first part 163a and the second part 163b from the outer side. Then, the fixing tape 100 is affixed to the overlapping parts. In this case, as shown in FIG. 17, since the third part 163c, the fourth part 163d, and the fifth part 163e overlap one another, both longitudinal ends of the bottom-face covering portion 163 are thicker than the central area thereof. The third part 163c and the fifth part 163e are in contact with the inner face 11a of the case 11. The central area of the bottom-face covering portion 163 floats from the inner face 11a of the case 11.

As shown in FIG. 17, since the number of overlapping layers varies in the region between the longitudinal ends of the bottom-face covering portion 163, the electrode assembly 14 is slightly inclined in the vertical direction. However, the thickness of the insulating sheet 160 is extremely small and accordingly, the inclined angle of the electrode assembly is negligibly small.

Figure 18A:
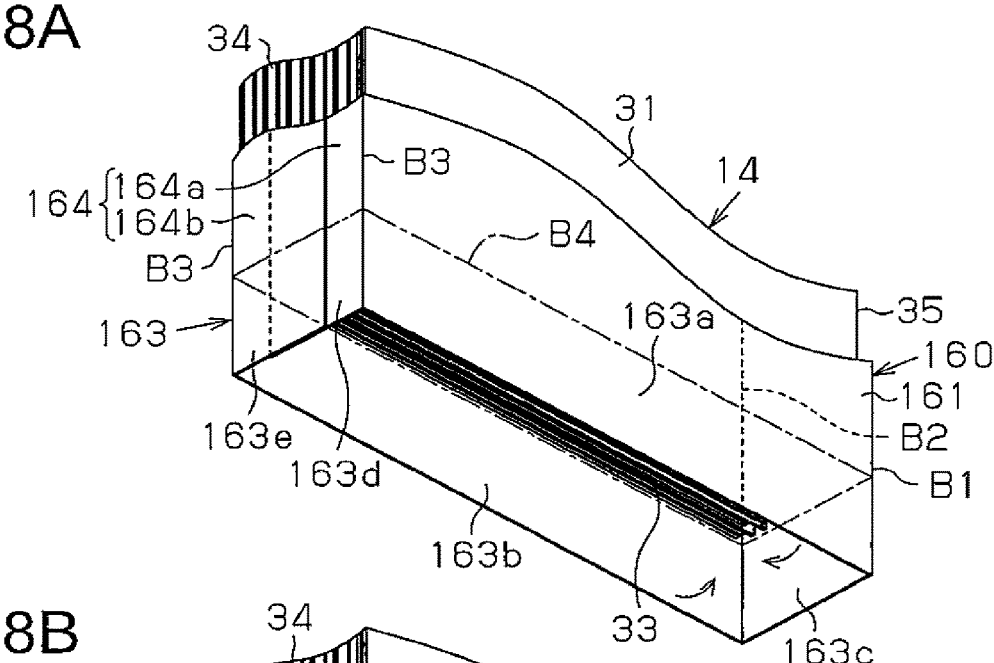
FIGS. 18A to 18C are perspective views showing a procedure of attaching the insulating sheet.
Figure 18B:
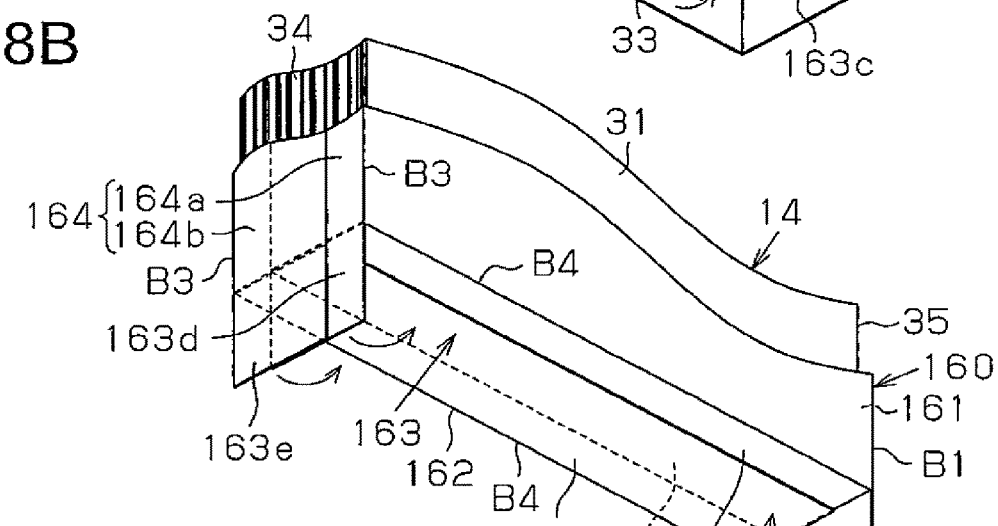
Figure 18C:
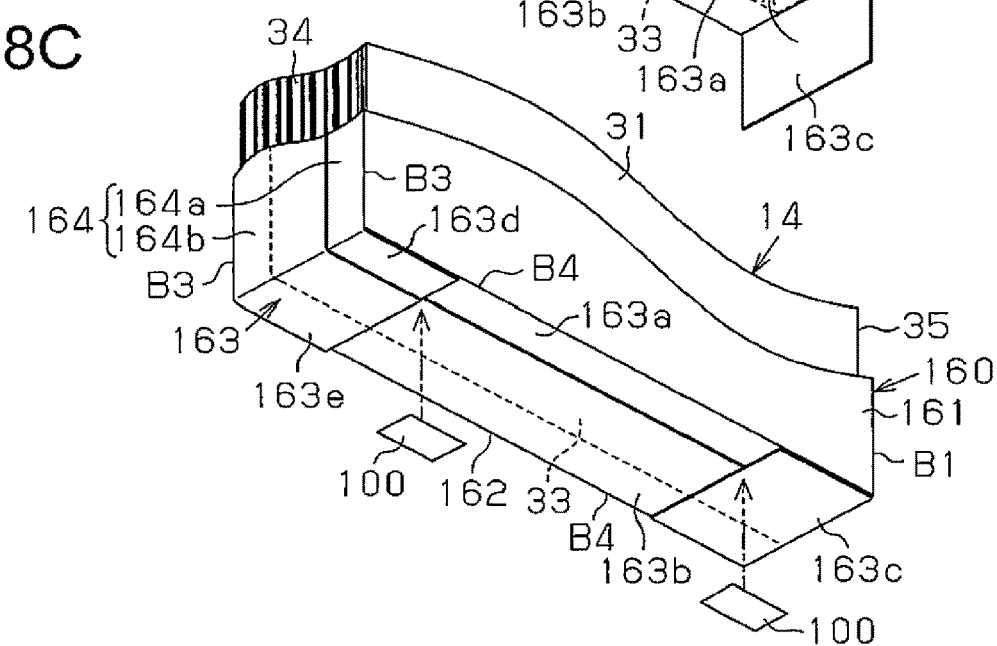

The folding manner of the insulating sheet 160 will be described in detail. First, as shown in FIG. 18A, the insulating sheet 160 is folded along the boundary lines B1 to B3 such that the parts 164a and 164b constituting the side-face covering portion 164 overlap each other. Then, the first part 163a and the second part 163b are folded toward the bottom face 33 of the electrode assembly 14 along the fourth boundary line B4. As shown in FIG. 18B, the third part 163c is folded toward the bottom face 33, and the fourth part 163d and the fifth part 163e is folded toward the bottom face 33. Further, as shown in FIG. 18C, the fixing tape 100 is affixed to an area where ends of the third part 163c and the second part 163b overlap each other. The fixing tape 100 is affixed to an area where ends of the second part 163b, the fourth part 163d, and the fifth part 163e overlap one another.

Operation of the present embodiment will now be described.

Since the overlapping area of the insulating sheet 160 in the bottom-face covering portion 163 contacts the inner face 11a of the case 11, when the electrode assembly 14 is displaced from the case 11, the overlapping area rubs against the inner face 11a of the case 11.

In addition to the above described advantages (1), (2), (4), and (8) to (11), the present embodiment achieves the following advantages.

(13) The insulating sheet 160 includes the bottom-face covering portion 163, which covers the bottom face 33 as an end face opposite to the upper end face 36, on which the tabs 41 and 42 of the electrode assembly 14 are present. The bottom-face covering portion 163, that is, the first part 163a and the second part 163b constituting the bottom-face covering portion 163 overlap each other and further, the parts 163c to 163e overlap thereon. Thus, the bottom face 33 of the electrode assembly 14 is unlikely to be exposed, improving the insulation.

In particular, the parts 163c to 163e overlap the first part 163a and the second part 163b from the outer side, that is, the side opposite to the electrode assembly 14. This prevents a stress of the electrode assembly 14 from concentrating on ends of the parts 163c to 163e. Accordingly, an imbalance of the stress is restrained.

(14) The overlapping area of the insulating sheet 160 in the bottom-face covering portion 163 is in contact with the inner face 11a of the case 11. Thus, even when the inner face 11a of the case 11 rubs against the overlapping area, the electrode assembly 14 is unlikely to be exposed. Therefore, exposure of the electrode assembly 14 caused by friction between the bottom-face covering portion 163 and the inner face 11a of the case 11 is favorably restrained.

(15) The insulating sheet 160 overlaps at both longitudinal ends of the bottom-face covering portion 163, which tends to be subjected to a large stress from the electrode assembly 14 as compared to the central region. With this structure, the stress of the electrode assembly 14 is favorably absorbed, restraining breakage of the insulating sheet 160 and exposure of the electrode assembly 14.

Sixth Embodiment

Figure 19:
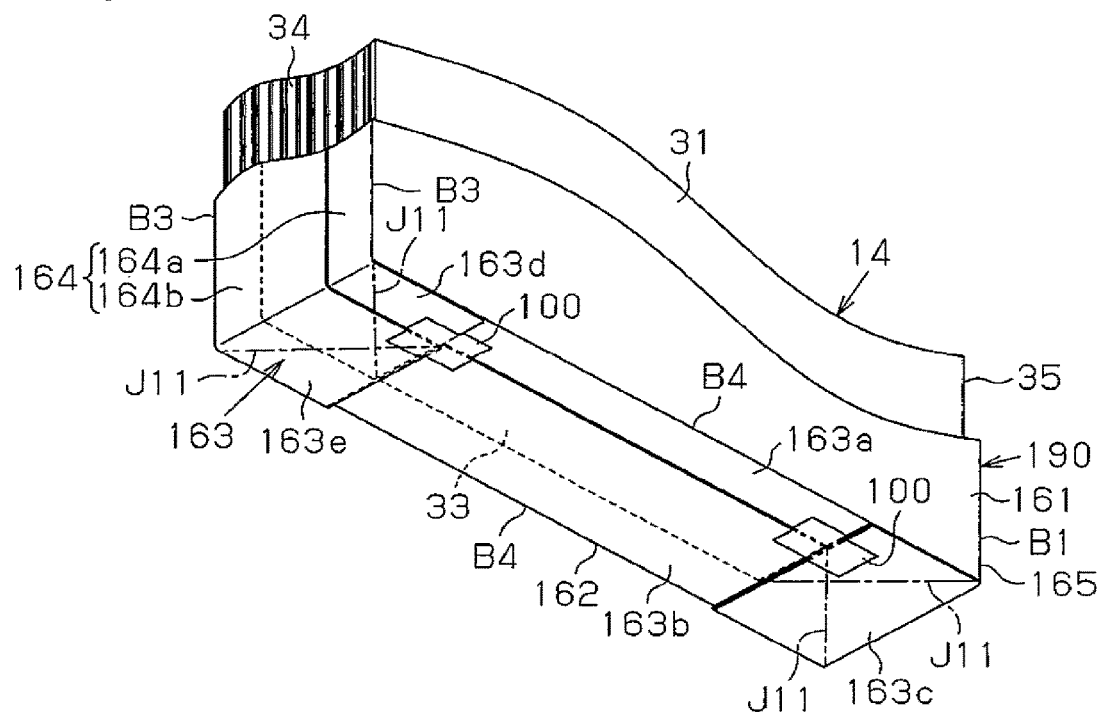
FIG. 19 is a perspective view of an electrode assembly and an insulating sheet according to a sixth embodiment.
Figure 20:
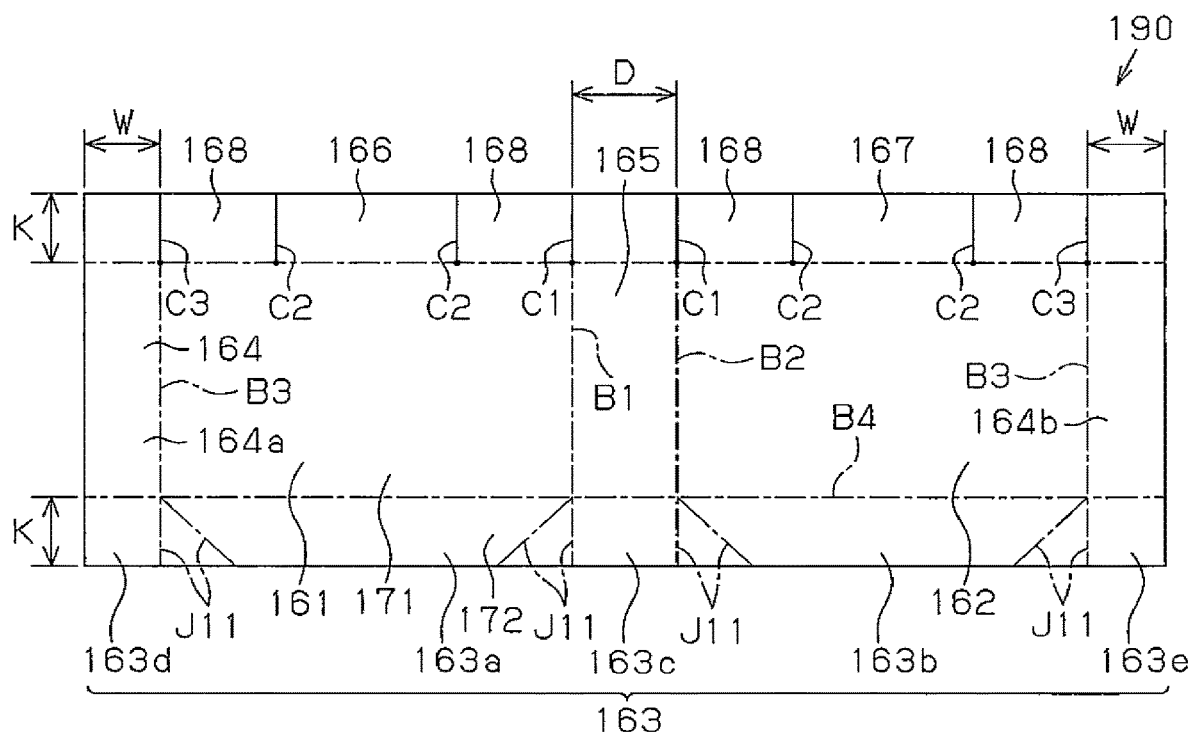
FIG. 20 is a front view of the spread insulating sheet.

As shown in FIGS. 19 and 20, an insulating sheet 190 in a sixth embodiment is folded along folding lines J11 to form a box. The insulating sheet 190 partially overlaps in the bottom-face covering portion 163. In this case, as shown in FIG. 19, the number of overlapping layers of the insulating sheet 190 is greater at both longitudinal ends of the bottom-face covering portion 163 than in the central region.

Figure 21A:
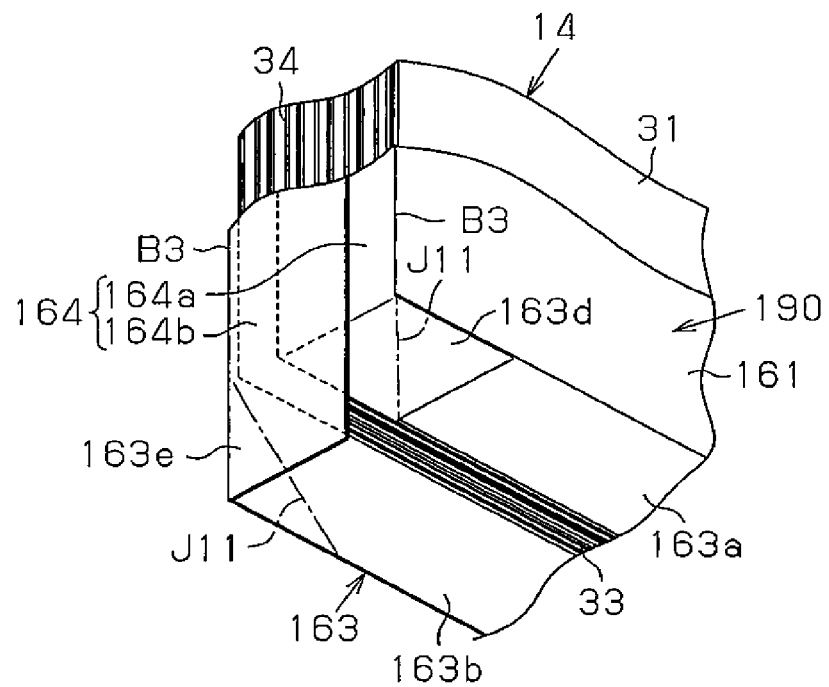
FIGS. 21A and 21B are perspective views showing a procedure of attaching the insulating sheet.
Figure 21B:
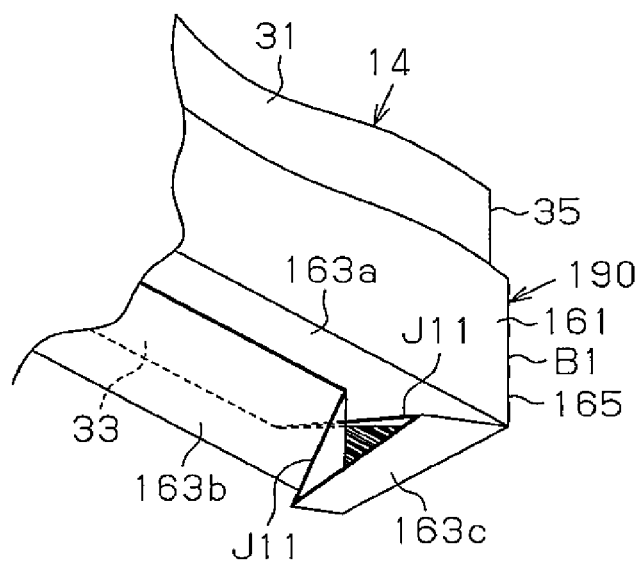

As shown in FIG. 20, the folding lines J11 are extended lines of the boundary lines B1 to B3 and lines extending from the intersections of the boundary lines B1 to B3 and the fourth boundary line B4 at an inclined angle of forty-five degrees. As shown in FIG. 21A, at one longitudinal end of the bottom-face covering portion 163, the first part 163a and the fourth part 163d are folded toward the bottom face 33 of the electrode assembly 14 along the folding lines J11 such that the fourth part 163d becomes the outer layer. Then, the second part 163b and the fifth part 163e are folded toward the bottom face 33 of the electrode assembly 14 along the folding lines J11 such that the fifth part 163e becomes the outer layer. As shown in FIG. 21B, at the other longitudinal end of the bottom-face covering portion 163, the third part 163c is folded toward the bottom face 33 of the electrode assembly 14 in the state where the parts 163a and 163b are folded along the folding lines J11. The action in the present embodiment is the same as that in the fifth embodiment and thus, description thereof is omitted.

In addition to the above described advantages of the fifth embodiment, the present embodiment achieves the following advantages.

(16) By folding the insulating sheet 190 along the folding lines J11, an overlapping area is formed in the bottom-face covering portion 163. This eliminates the necessity of providing incisions, restraining the formation of gaps to simplify processing of the insulating sheet 190. The number of overlapping layers can be increased by folding the insulating sheet 190. Therefore, the insulation is further improved.

The above described embodiment may be modified as follows.

Figure 22:
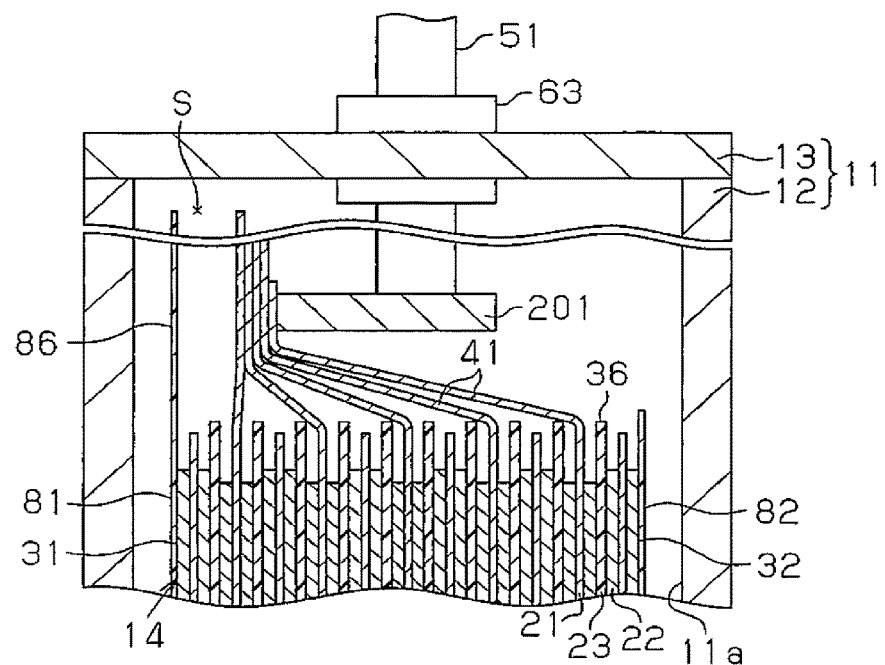
FIG. 22 is a cross-sectional view of a power collection structure in a modification.

As a connection structure (a power collection structure), as shown in FIG. 22, each positive-electrode tab 41 may stand toward the lid 13 while being inclined toward the primary face 31 in the stacking direction of the electrode assembly 14, and a positive-electrode conductive member 201 welded to each positive-electrode tab 41 in the stacking direction may be provided. In this case, the positive-electrode tabs 41 and the case 11 tend to cause a short circuit on the side toward which the positive-electrode tabs 41 are inclined, and does not tend to cause a short circuit on the opposite side. In this case, the protruding portion 86 on the side where no short circuit occurs (the side of the primary face 32 of the stacking direction of the electrode assembly 14) may be omitted. At this time, the standing dimension of the protruding portion 86 from the upper end face 36 may be set to be the protruding dimension of the positive-electrode tab 41 or more. The protruding portion 86 itself may be omitted.

Figure 23:
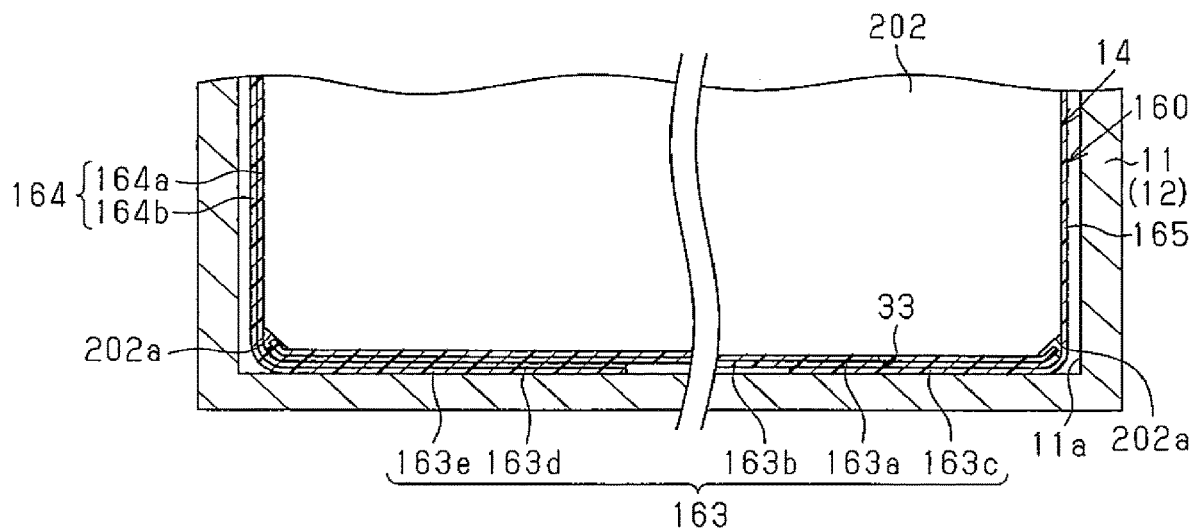
FIG. 23 is a cross-sectional view of a separator and an electrode assembly in a modification.

As shown in FIG. 23, a separator 202 that has notches 202a at chamfered corners may be used. In this case, portions that cover ends of the separator 202 in the bottom-face covering portion 163 may be overlapping areas of the insulating sheet 160. Thereby, stresses exerted to the ends are favorably received. The electrodes 21 and 22 may be similarly chamfered. In summary, the overlapping areas of the insulating sheet may cover the ends of the bottom face 33 of the electrode assembly 14.

Figure 24:
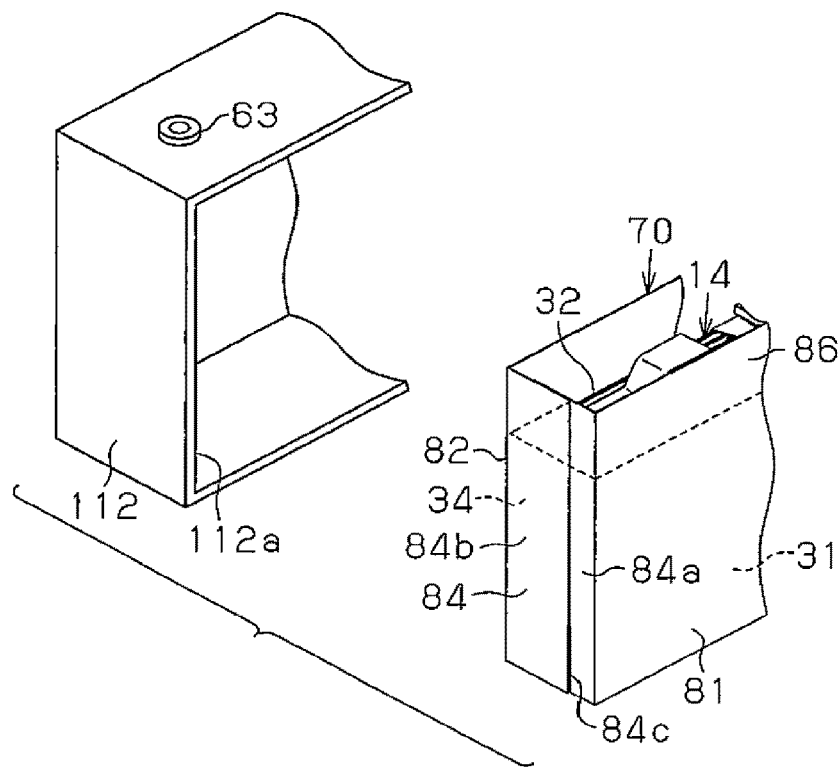
FIG. 24 is a perspective view showing a manner of folding an insulating sheet in a modification.
Figure 25:
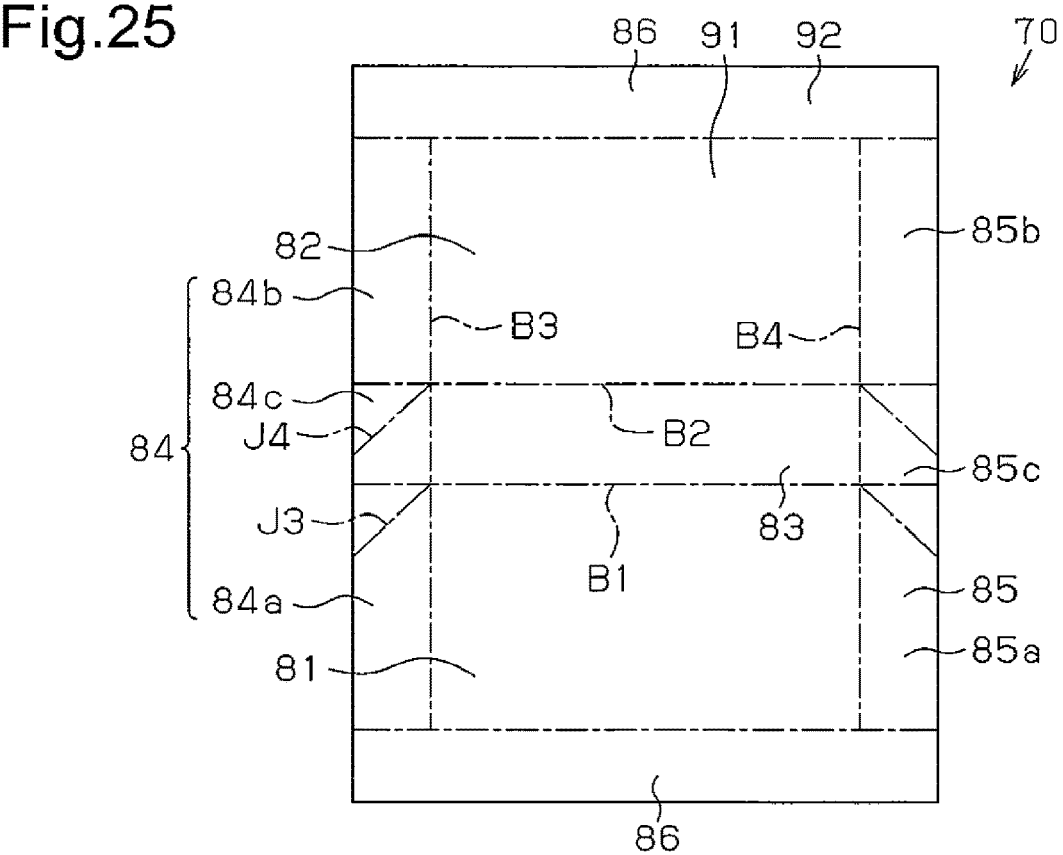
FIG. 25 is a front view of a spread insulating sheet in a modification.

In the first embodiment, the electrode assembly 14 is inserted into the container 12 from the bottom face 33. However, by adopting the container 112 in the second embodiment, the electrode assembly 14 may be inserted into the container 112 from the primary face 32 in the stacking direction of the electrode assembly 14. In this case, as shown in FIG. 24, the insulating sheet 70 may be folded such that the second part 84b continuous with the primary-face covering portion 82 that covers the primary face 32 becomes the outermost layer. Specifically, as shown in FIG. 25, a first folding line J3 inclined from a first intersection of the first boundary line B1 and the third boundary line B3 toward the side opposite to the second part 84b by forty-five degrees, and a second folding line J4 inclined from a second intersection of the first boundary line B1 and the third boundary line B3 toward the first part 84a by forty-five degrees are assumed. Then, the sheet is mountain-folded along the first folding line J3 and valley-folded along the first part 84a and the third boundary line B3 to place the first part 84a on the side face 34 of the electrode assembly 14. Further, the sheet is mountain-folded along the second folding line J4, and valley-folded along the third boundary line B3 to place the second part 84b on the first part 84a.

In each of the embodiment, the boundary lines B1 to B6 may be configured to facilitate folding. For example, the boundary lines B1 to B6 may be thinner than the other area, or creases may be previously formed along the boundary lines B1 to B6.

In each of the embodiments, the first width W is set to be smaller than the thickness D of the electrode assembly 14. however, the first width W may be set to be greater than the thickness D of the electrode assembly 14. In this case, the sheet may be folded again so as not to protrude outward in the stacking direction from the primary-face covering portions 81 and 82.

In the first, second, and fourth embodiments, the lengths in the extending direction (the lengths in the direction orthogonal to the boundary lines B3 and B4) of the side-face covering portions 84, 134 that covers the side face 34 of the electrode assembly 14 and the side-face covering portions 85, 135 that cover the side face 35 of the electrode assembly 14 are each the same first width W. However, these lengths may be different from each other.

In the first, second, and fourth embodiments, the first width W is the same as the protruding dimension K. However, these may be different from each other. For example, the protruding dimension K may be the same as the collecting dimension T1.

The protruding dimension K may be smaller than the projecting length T0 of the positive-electrode tab 41 from the upper end face 36 or the collecting dimension T1. In this case, an insulating member for isolating the conductive members 61 and 62 from the cases 11, 111 may be provided.

In the first embodiment, the protruding portion 86 is shaped like a frame. However, the portions continuous with the side-face covering portions 84 and 85 may be omitted such that protruding portions 86 are opposed to each other with the distance therebetween in the stacking direction. The same also applies to the other embodiments.

In each of the embodiments, the relationship of T1<D holds. However, a relationship of T1=D may hold. In summary, a relationship of 0<T1≤D only needs to hold. Thereby, in the case where the protruding dimension K is set to be collecting dimension T1 or more to be located between the tabs 41 and 42 and the cases 11, 111, the protruding dimension K can be prevented from being greater than the thickness D of the electrode assembly 14. Therefore, in the second and third embodiments, when the top-face covering portions 138, 168 are folded, the portion can be prevented from partially protruding from the electrode assembly 14 in the stacking direction while ensuring insulation between the tabs 41 and 42 and the cases 11, 111.

In the case of T1>D/2, when the protruding dimension K is set to be the collecting dimension T1 or more to be located between the tabs 41 and 42 and the cases 11, 111, the protruding dimension K becomes greater than D/2. Accordingly, when being folded, the top-face covering portions 138, 168 overlap, improving the insulation.

In the fourth embodiment, the relationship of T1<K<D/2 holds. However, a relationship of T1≤K≤D/2 only needs to hold. For example, a relationship of T1≤D/2≤K may be used. In summary, a relationship of K≥T1 and T1≤D/2 only needs to be satisfied.

Under the situation of T1≤D/2, for example, when a relationship of K>D/2 is set such that the top-face covering portion 183 partially overlaps, the tabs 41 and 42 are located between the protruding portions 181 and 182. This favorably covers the upper end face 36, and favorably isolates the tabs 41 and 42 from the case 11. However, in terms of miniaturization of the insulating sheet 180, a relationship of T1≤K≤D/2 is preferable.

In the fourth embodiment, the projecting length T0 of each positive-electrode tab 41 from the upper end face 36 may be used in place of the collecting dimension T1. That is, a relationship of K≥T0 and T0≤D/2 only needs to hold, and for example, a relationship of T1>K≥T0 and T0≤D/2<T1 may hold.

In the second embodiment, the third incisions C3 are formed along the third boundary line B3 and the fourth boundary line B4. However, the third incisions C3 may be formed along the fifth boundary line B5 and the sixth boundary line B6. In summary, the incision only needs to be formed from a corner at which two intersecting sides cross each other in the boundary lines B3 to B6 of the base portion 141 and the extending portion 142 along one of the two sides.

In the second embodiment, the dimension of each of the incisions C1 to C3 is the first width W or the protruding dimension K and however, may be smaller than the first width W or the protruding dimension K. In this case, corners of the box-like insulating sheet 120 have no gap caused by the holes 151, and overlapping areas cover the holes 151. This further improves the insulation.

In the second embodiment, the hole 151 is circular. However, the hole 151 may take any shape as long as it protrudes toward the base portion 141 in a curved shape. For example, the hole may be elliptic. Although the diameter of the hole 151 is set to be greater than the width of each of the incisions C1 to C3, they may be identical. The holes 151 may be omitted.

In the third embodiment, the incisions C1 to C3 are formed. However, the incisions C1 to C3 may be omitted. In this case, as in the first embodiment, the insulating sheet 160 is folded into a box shape.

The insulating sheets 70, 120, 160, 180, and 190 may be square. In summary, the insulating sheet only needs to be rectangular. In this case, the insulating sheet need not be exactly rectangular, and may have a notch or protrusion. In summary, by folding, the insulating sheet only needs to be shaped like a box that can cover the faces 31 to 35 of the electrode assembly 14 except for the upper end face 36, and has continuous covering portions (no gap from which the electrode assembly 14 is exposed).

In each of the embodiments, the relationship of W<D holds. However, a relationship of W≤D only needs to hold. In the case of W=D, the fixing tape 100 is difficult to fall within the side-face covering portion 84 and thus, W<D, which ensures the region for the fixing tape 100, is more preferable.

In the fifth embodiment, the relationship of K=D and W=D/2 may hold. In this case, the insulating sheet 160 does not overlap in the side-face covering portion 164, while the insulating sheet 160 overlaps in at least two layers in the bottom-face covering portion 163. Describing in detail, the first part 163a and the second part 163b wholly overlap each other. Accordingly, at the center of the bottom-face covering portion 163, the insulating sheet 160 overlaps in two layers. The fourth part 163d and the fifth part 163e, which do not overlap each other, overlap the first part 163a and the second part 163b. That is, at one longitudinal end of the bottom-face covering portion 163, the insulating sheet 160 overlaps in three layers. On the other hand, the third part 163c overlaps the first part 163a and the second part 163b, and at the other longitudinal end of the bottom-face covering portion 163, the insulating sheet 160 overlaps in three layers. In this manner, in the bottom-face covering portion 163, a variation in the number of overlapping layers of the insulating sheet 160 in the region between the longitudinal ends is limited.

In the fifth embodiment, a relationship of K=W=D may hold. In this case, the insulating sheet 160 can overlap in four layers at the upper longitudinal end of the bottom-face covering portion 163.

Figure 26:
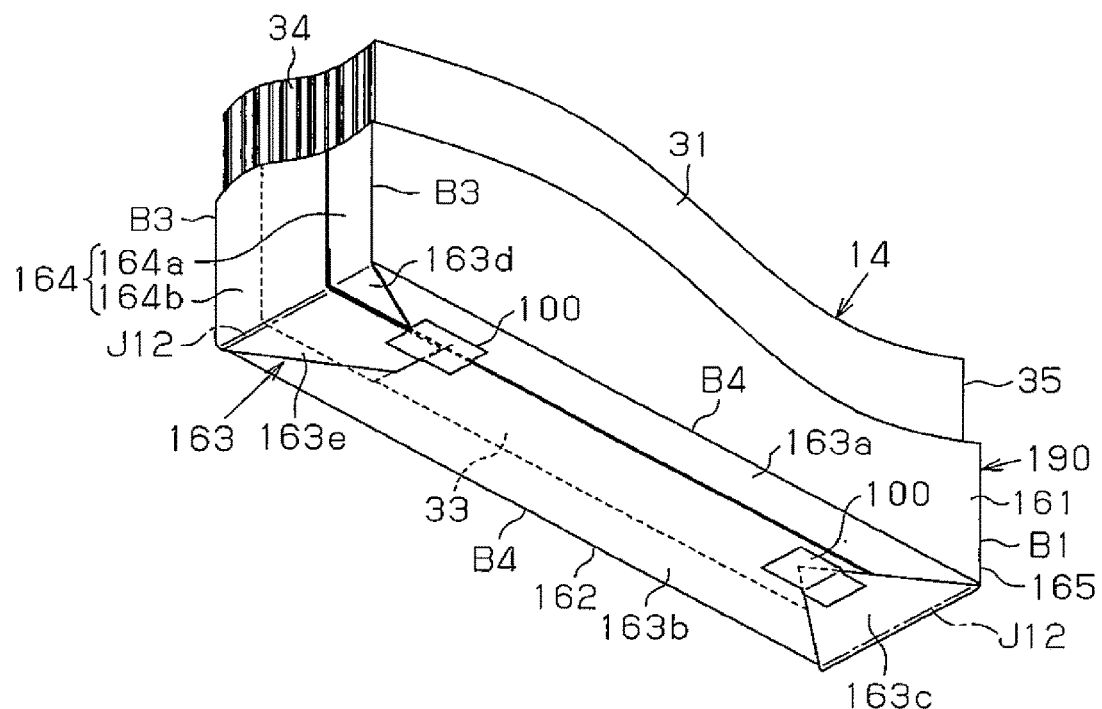
FIG. 26 is perspective view of an insulating sheet and an electrode assembly in a modification.
Figure 27:
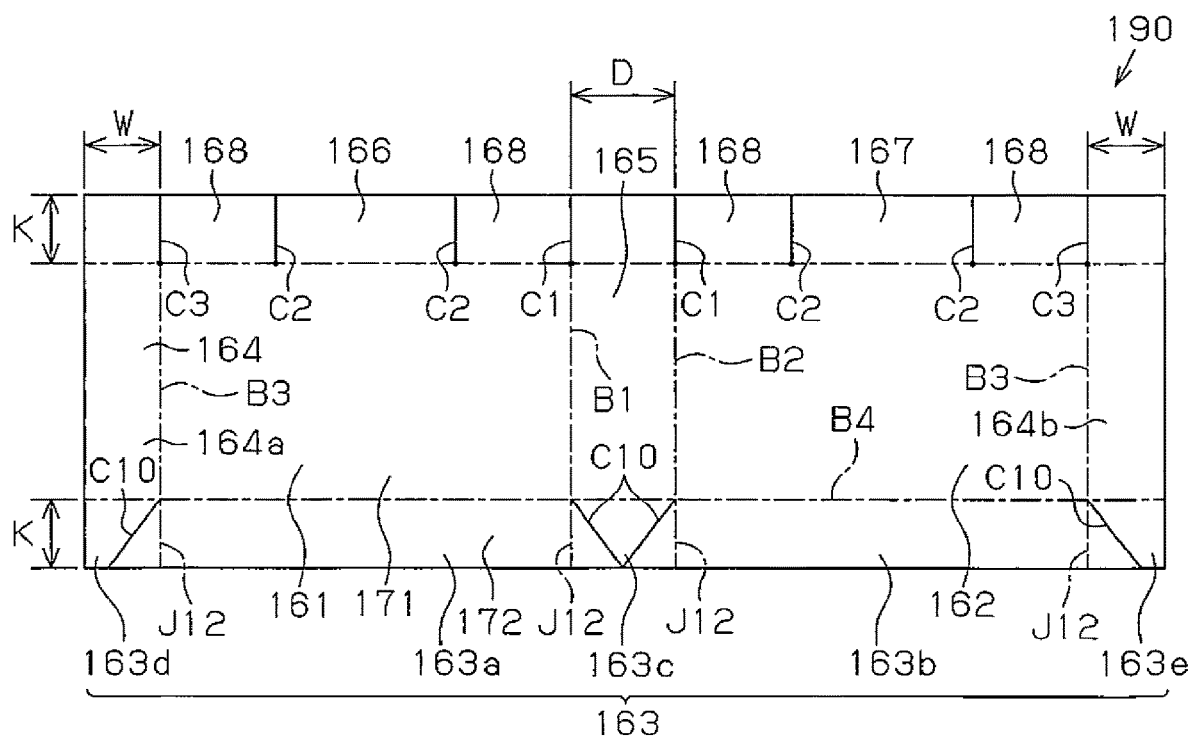
FIG. 27 is a front view of a spread insulating sheet in a modification.

As shown in FIGS. 26 and 27, the triangular third part 163c may overlap the first part 163a and the second part 163b. In this case, as shown in FIG. 27, the bottom-face covering portion 163 of the insulating sheet 190 has a plurality of incisions C10. The incisions C10 extend obliquely from an intersection of the first boundary line B1 and the fourth boundary line B4, an intersection of the second boundary line B2 and the fourth boundary line B4, and an intersection of the third boundary line B3 and the fourth boundary line B4. In this case, the third part 163c is a triangle having a V-shaped contour, and the fourth part 163d and the fifth part 163e are trapezoidal. Folding lines J12 are present on extended lines of the boundary lines B1 to B3. The insulating sheet 190 is folded such that the third part 163c becomes the outermost layer, and is folded along the folding lines J12 such that the fifth part 163e overlaps the fourth part 163d to form a box. In this case, the folding lines J12 overlap the edge of the electrode assembly 14, and the insulating sheet 190 overlaps at the edge, which improves the insulation.

Figure 28:
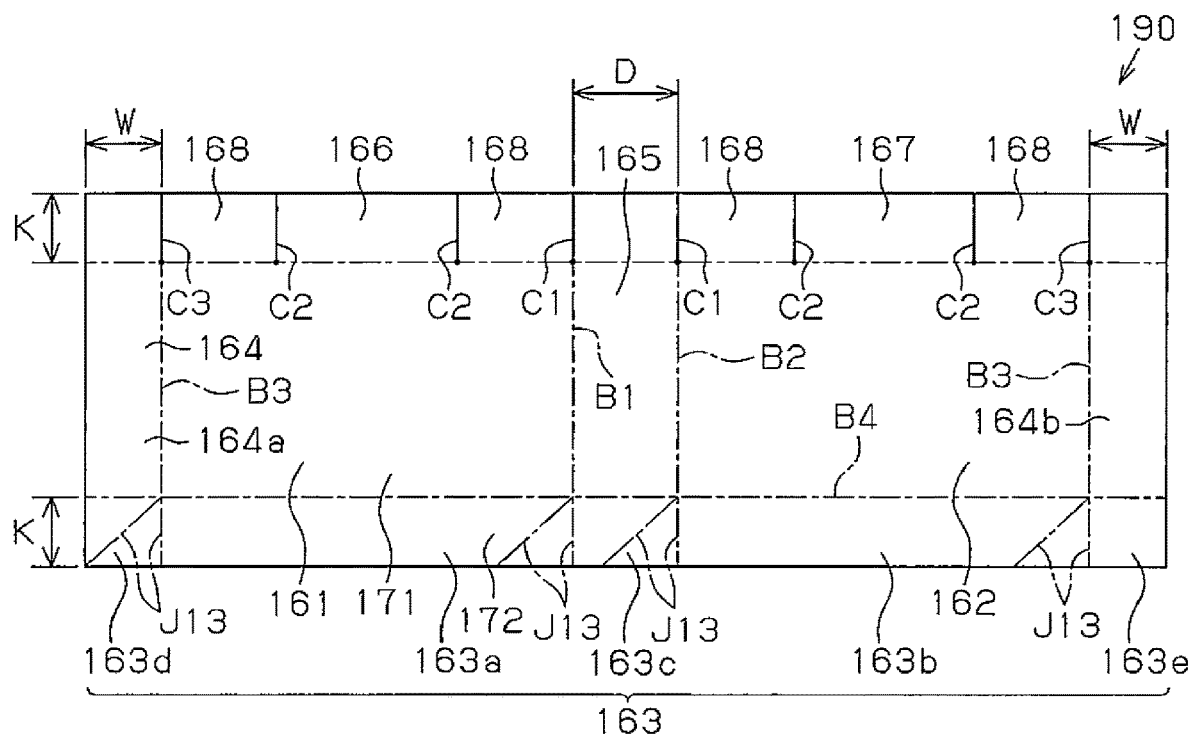
FIG. 28 is a front view of a spread insulating sheet in a modification.
Figure 29:
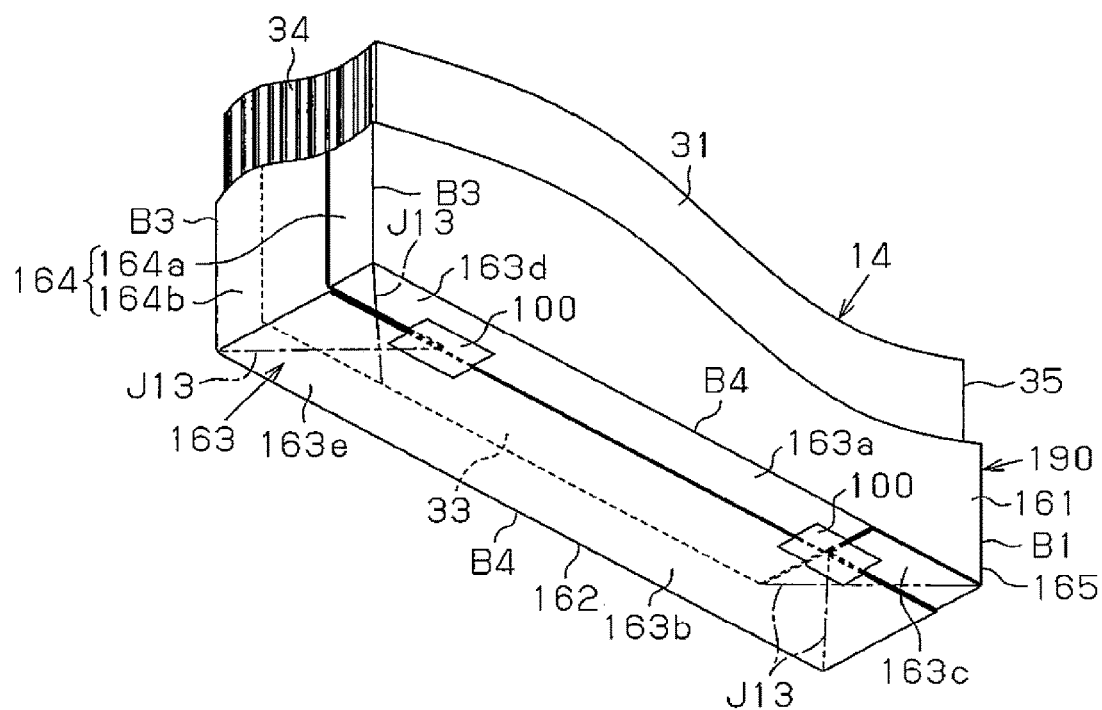
FIG. 29 is a perspective view of an insulating sheet and an electrode assembly in a modification.

As shown in FIG. 28, folding lines J13 having the same inclination direction may be defined. In this case, unlike the folding lines J11 in FIG. 20, the folding line J13 is arranged on the third part 163c. Also in this case, as shown in FIG. 29, overlapping areas of the insulating sheet 190 are formed in the bottom-face covering portion 163.

Figure 30:
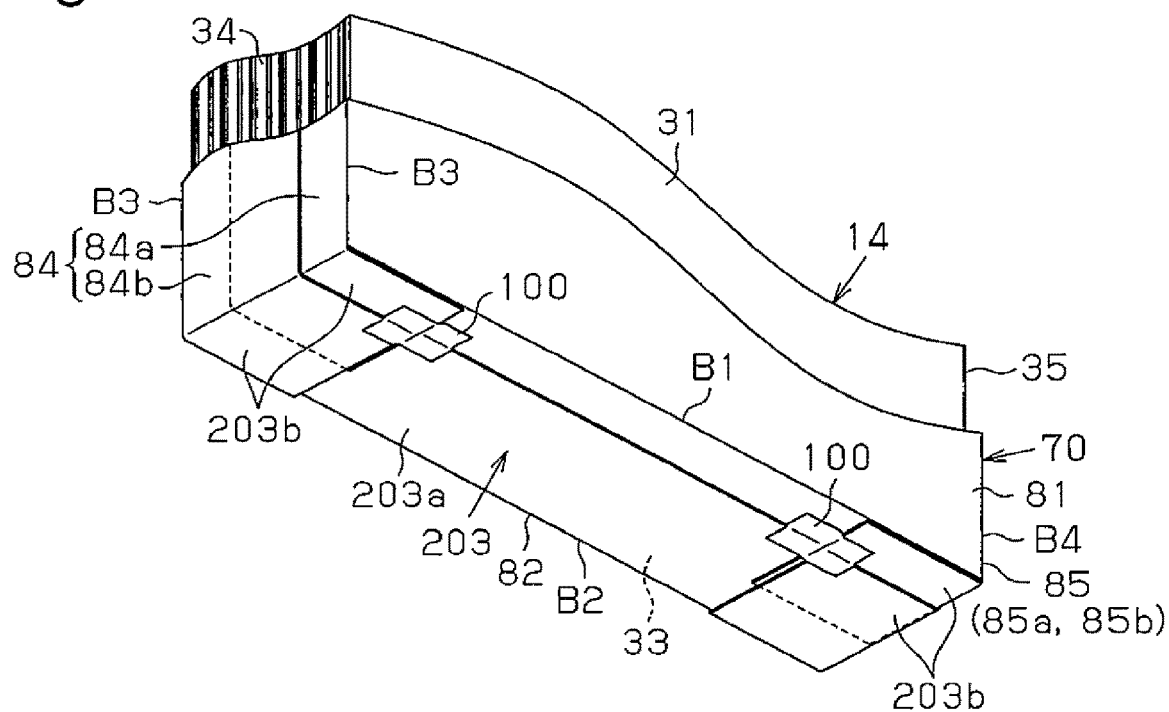
FIG. 30 is a perspective view of an insulating sheet and an electrode assembly in a modification.
Figure 31:
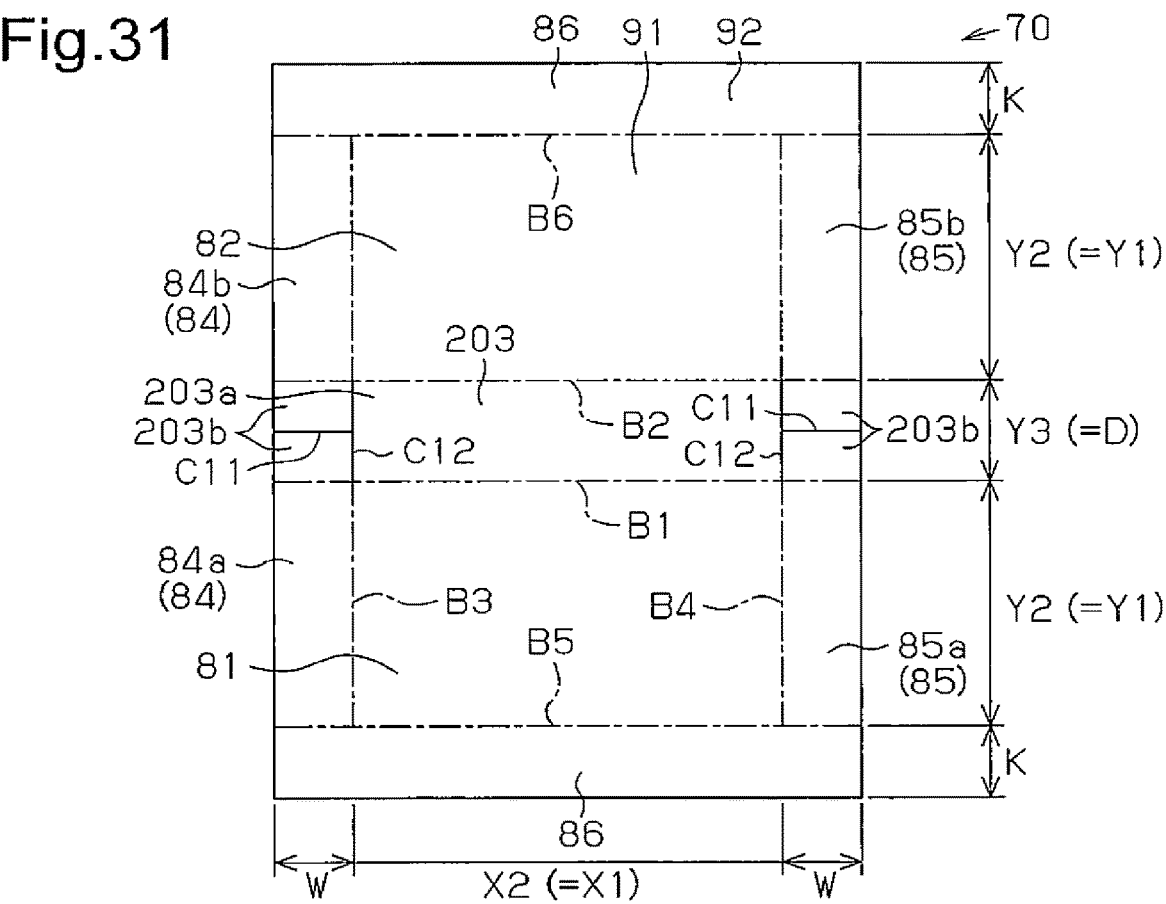
FIG. 31 is a front view of a spread insulating sheet in a modification.

As shown in FIG. 30, the side-face covering portions 84 and 85 may include overlapping first parts 84a and 85a and overlapping second parts 84b and 85b, and a bottom-face covering portion 203 may include overlapping first part 203a and second parts 203b. In this case, the overlapping areas of the insulating sheet 70 exist in both of the bottom-face covering portion 203 and the side-face covering portion 84. This further improves the insulation. In this modification, the bottom-face covering portion 83 in the first embodiment is replaced with the first part 203a, and the third parts 84c and 85c in the first embodiment are replaced with the second parts 203b. As an example of attaching the insulating sheet 70 as described above, as shown in FIG. 31, the insulating sheet 70 includes incisions C11 for dividing the second part 203b into two and incisions C12 for separating the first part 203a from the second part 203b. In this case, the insulating sheet 70 is folded such that the divided second parts 203b overlap the first part 203a.

Figure 32:
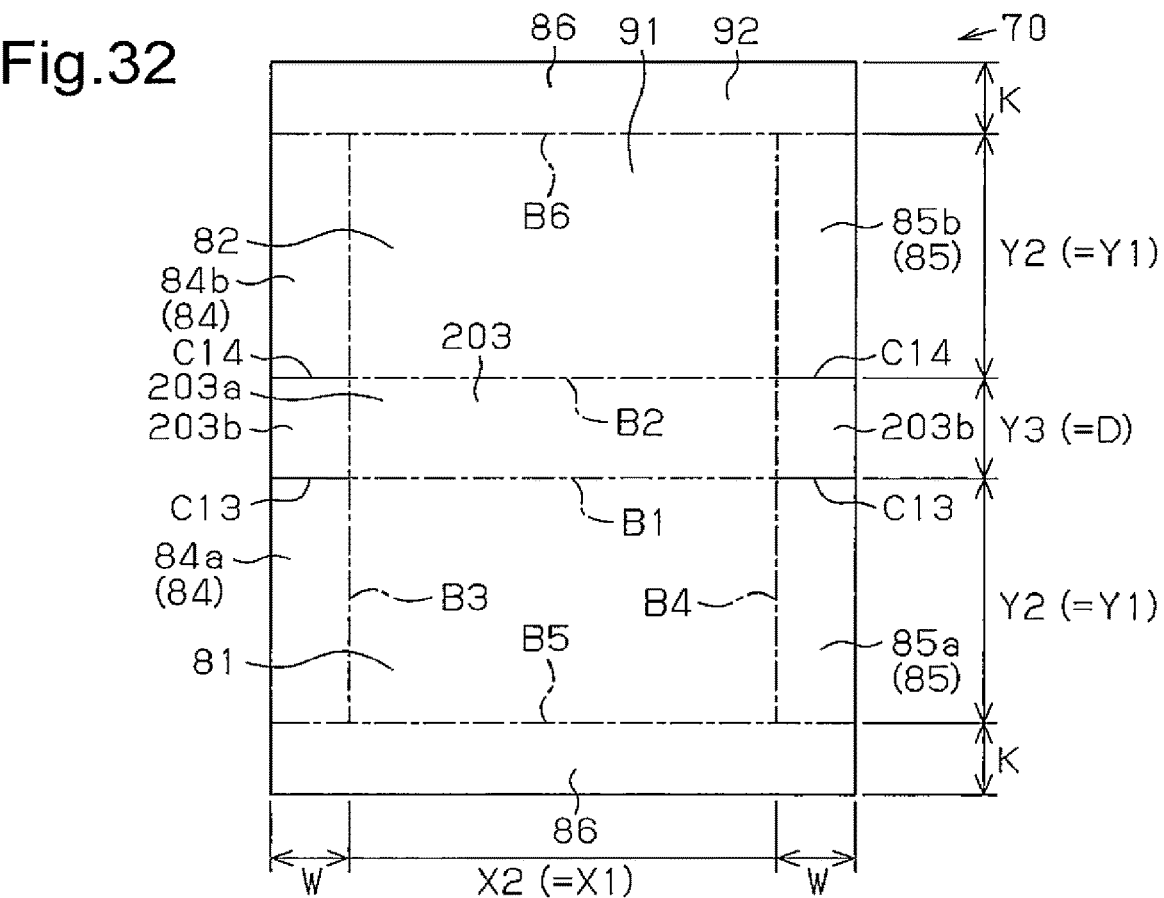
FIG. 32 is a front view of a spread insulating sheet in a modification.
Figure 33:
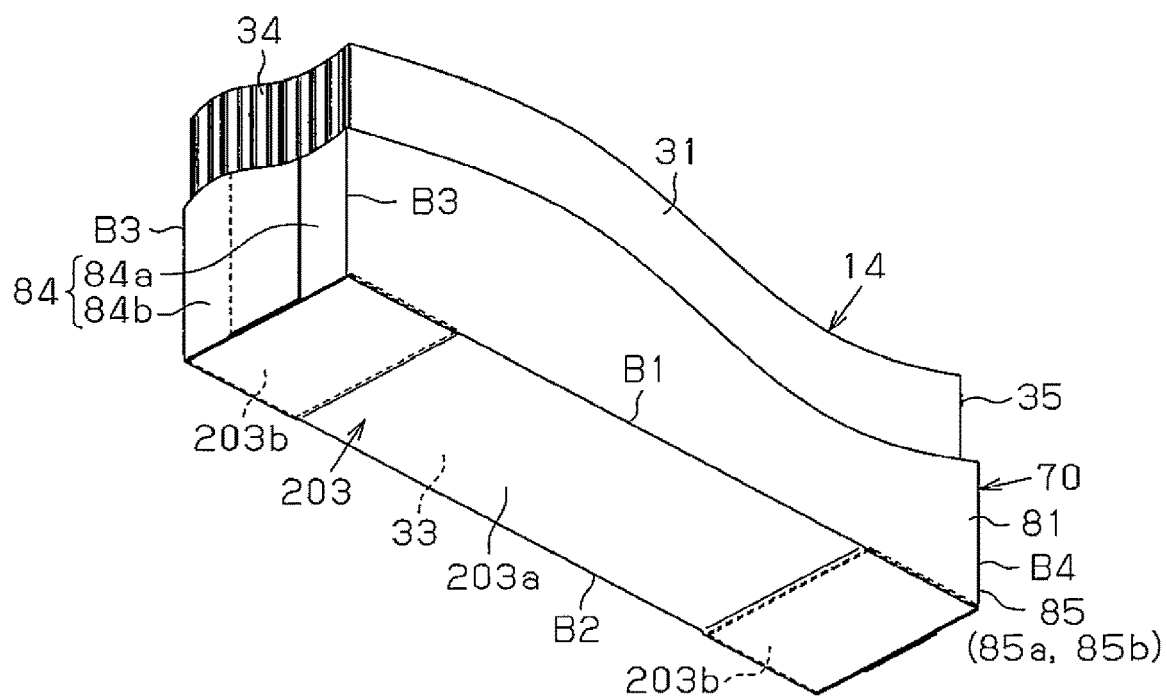
FIG. 33 is a perspective view of an insulating sheet and an electrode assembly in a modification.

As shown in FIG. 32, incisions C13 for separating the second part 203b from the first parts 84a and 85a, and incisions C14 for separating the second part 203b from the second parts 84b and 85b may be formed. In this case, the second parts 203b are folded toward the first part 203a. As a result, as shown in FIG. 33, overlapping areas of the insulating sheet 70 are formed in the bottom-face covering portion 203.

Figure 34:
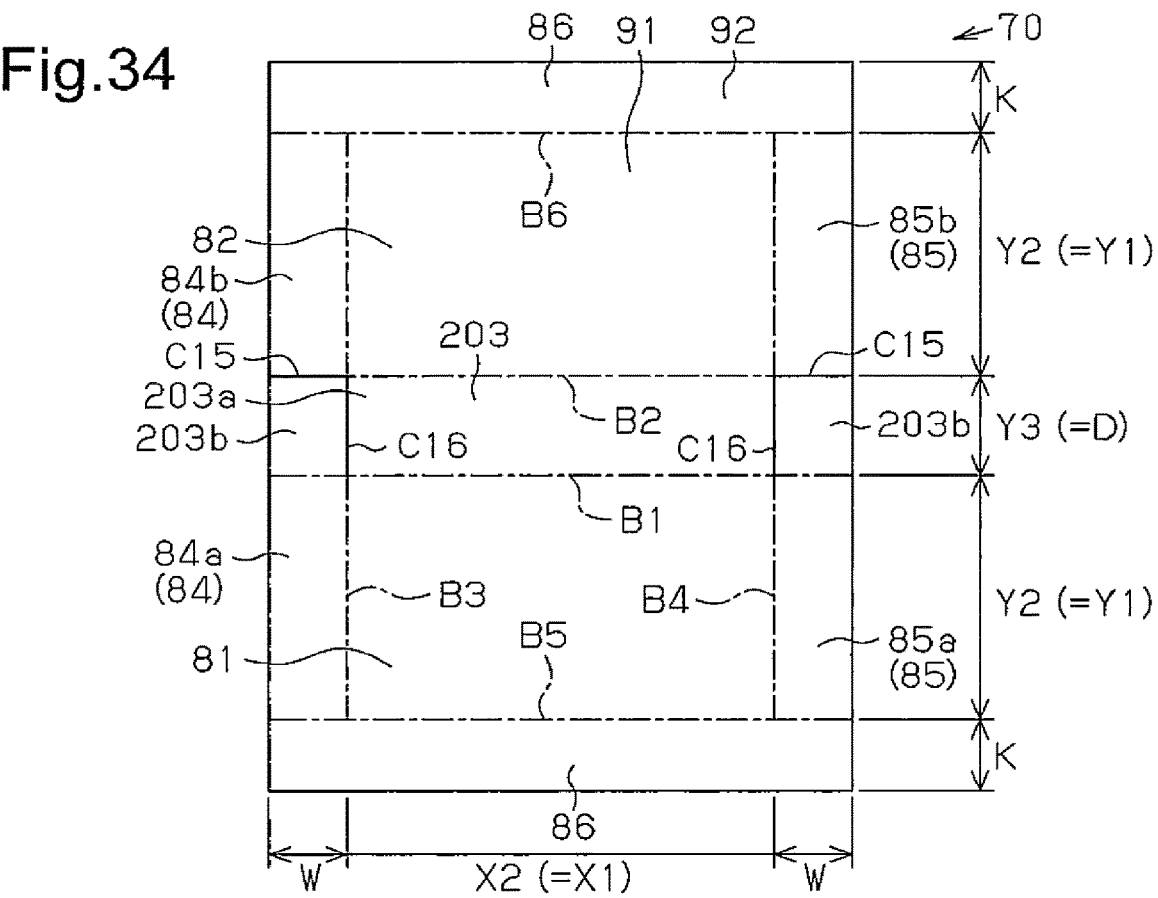
FIG. 34 is a front view of a spread insulating sheet in a modification.
Figure 35:
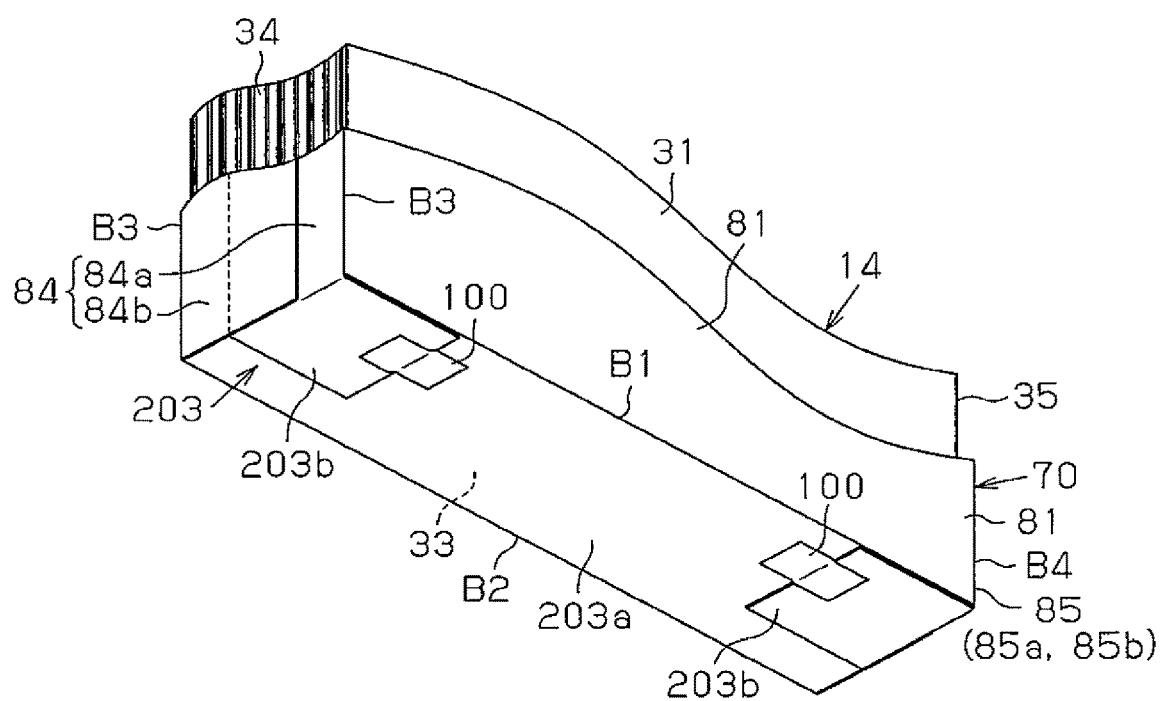
FIG. 35 is a perspective view of an insulating sheet and an electrode assembly in a modification.

As shown in FIG. 34, incisions C15 for separating the second part 203b from the second parts 84b and 85b and incisions C16 for separating the second part 203b from the first part 203a may be provided. Also in this case, as shown in FIG. 35, by folding the second parts 203b toward the first part 203a, overlapping areas of the insulating sheet 70 are generated in the bottom-face covering portion 203.

Figure 36:
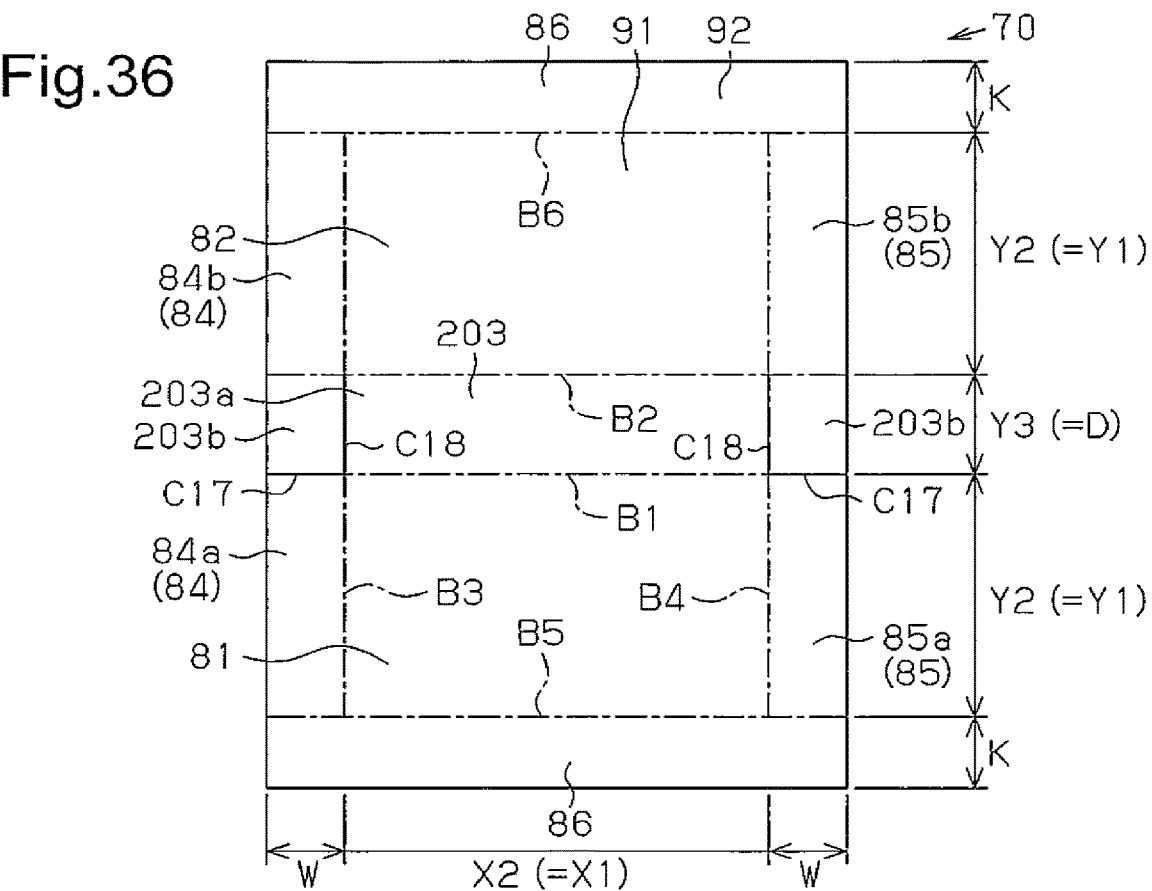
FIG. 36 is a front view of a spread insulating sheet in a modification.
Figure 37:
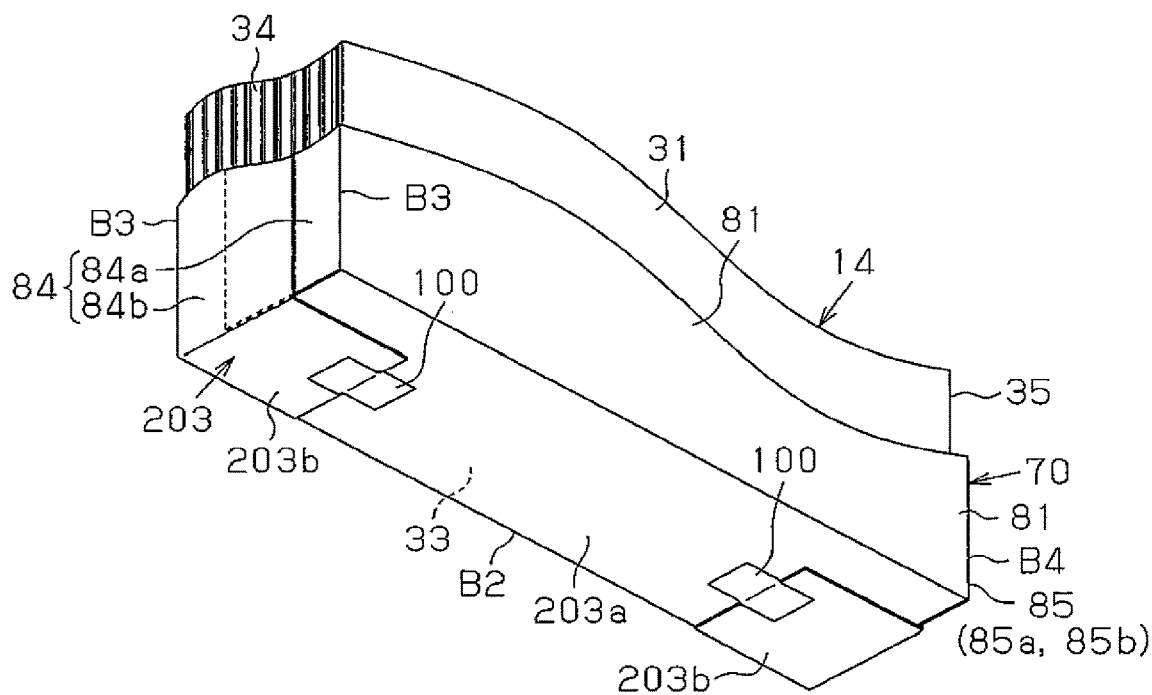
FIG. 37 is a perspective view of an insulating sheet and an electrode assembly in a modification.

Similarly, as shown in FIG. 36, incisions C17 for separating the second part 203b from the first parts 84a and 85a and incisions C18 for separating the second part 203b from the first part 203a may be provided. Also in this case, as shown in FIG. 37, by folding the second parts 203b toward the first part 203a, overlapping areas of the insulating sheet 70 are generated in the bottom-face covering portion 203.

Figure 38:
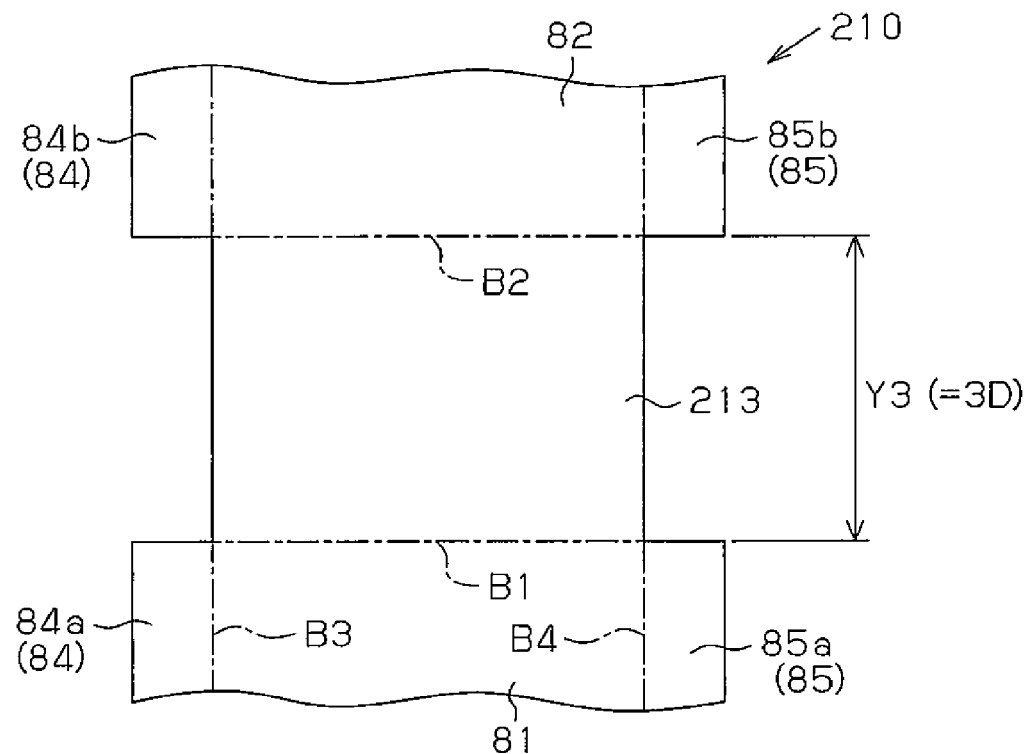
FIG. 38 is a front view of a spread insulating sheet in a modification.
Figure 39:
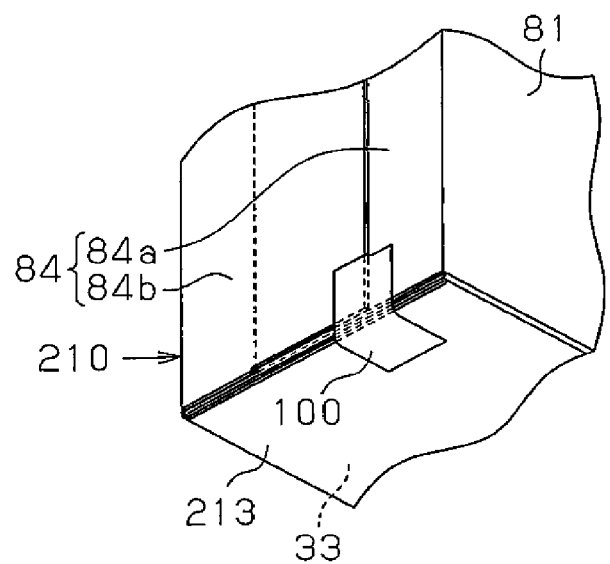
FIG. 39 is a perspective view of an insulating sheet and an electrode assembly in a modification.

As shown in FIG. 38, an insulating sheet 210 may be adopted, in which the second parts 203b are omitted, and a length Y3 of a bottom-face covering portion 213 in the spread state is set to be greater than the thickness D of the electrode assembly 14, in particular, three times of the thickness D. In this case, as shown in FIG. 39, the insulating sheet 210 may be accordion-folded in the bottom-face covering portion 213.

Figure 40:
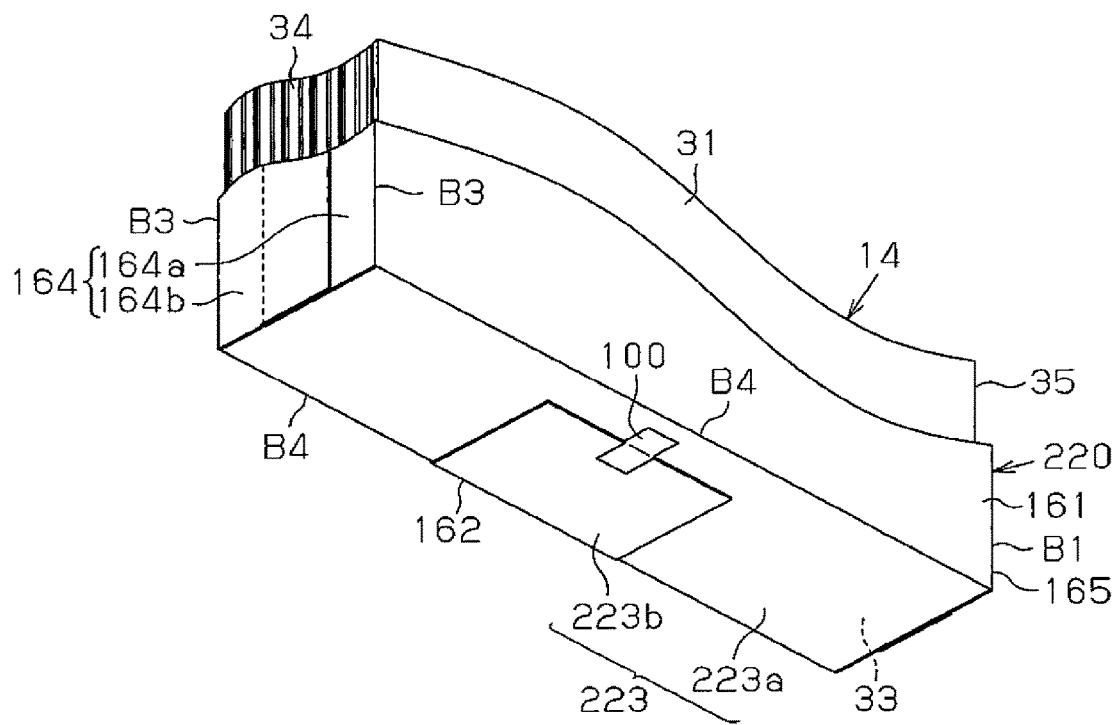
FIG. 40 is a perspective view of an insulating sheet and an electrode assembly in a modification.
Figure 41:
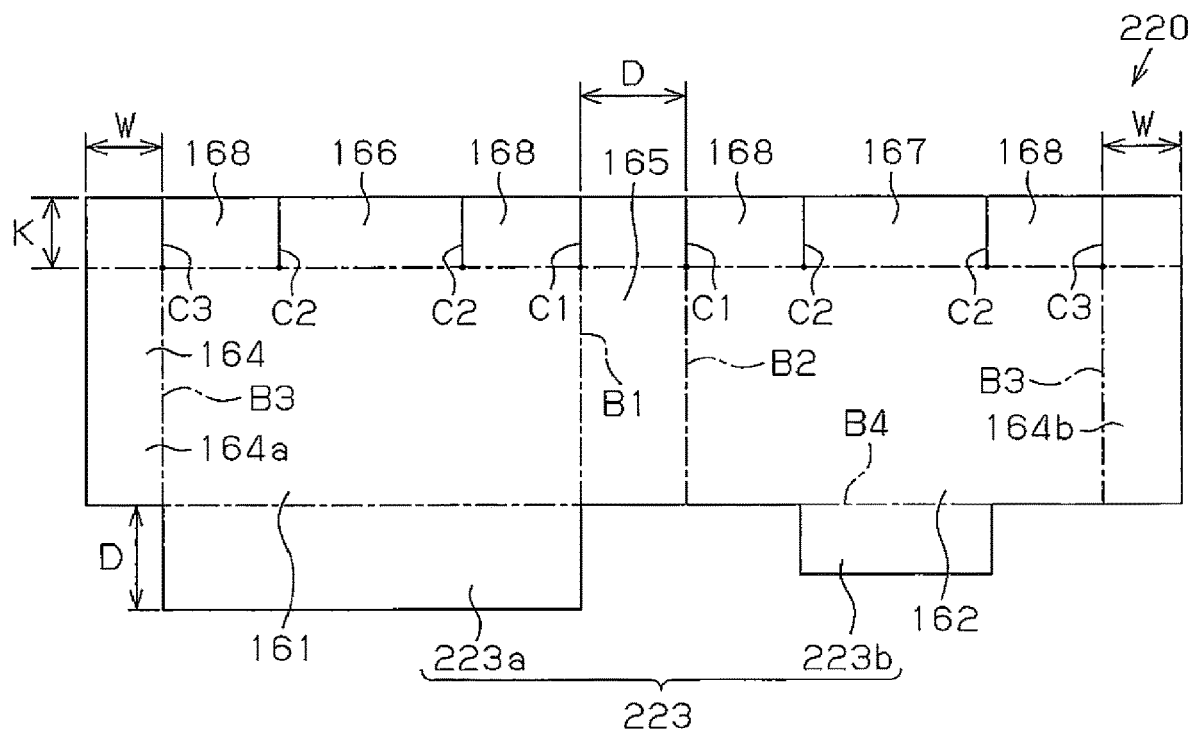
FIG. 41 is a front view of a spread insulating sheet in a modification.

As shown in FIG. 40, an insulating sheet 220 may partially overlap at the central region of a bottom-face covering portion 223 rather than both longitudinal ends. As shown in FIGS. 40 and 41, the insulating sheet 220 includes a first part 223a continuous with the primary-face covering portion 161 and a second part 223b continuous with the primary-face covering portion 162. The first part 223a and the bottom face 33 of the electrode assembly 14 have the same shape. The second part 223b is smaller than the bottom face 33 of the electrode assembly 14, and extends in the transverse direction from the center of an end in the transverse direction of the primary-face covering portion 162. The second part 223b overlaps the first part 223a to form the bottom-face covering portion 223.

Figure 42:
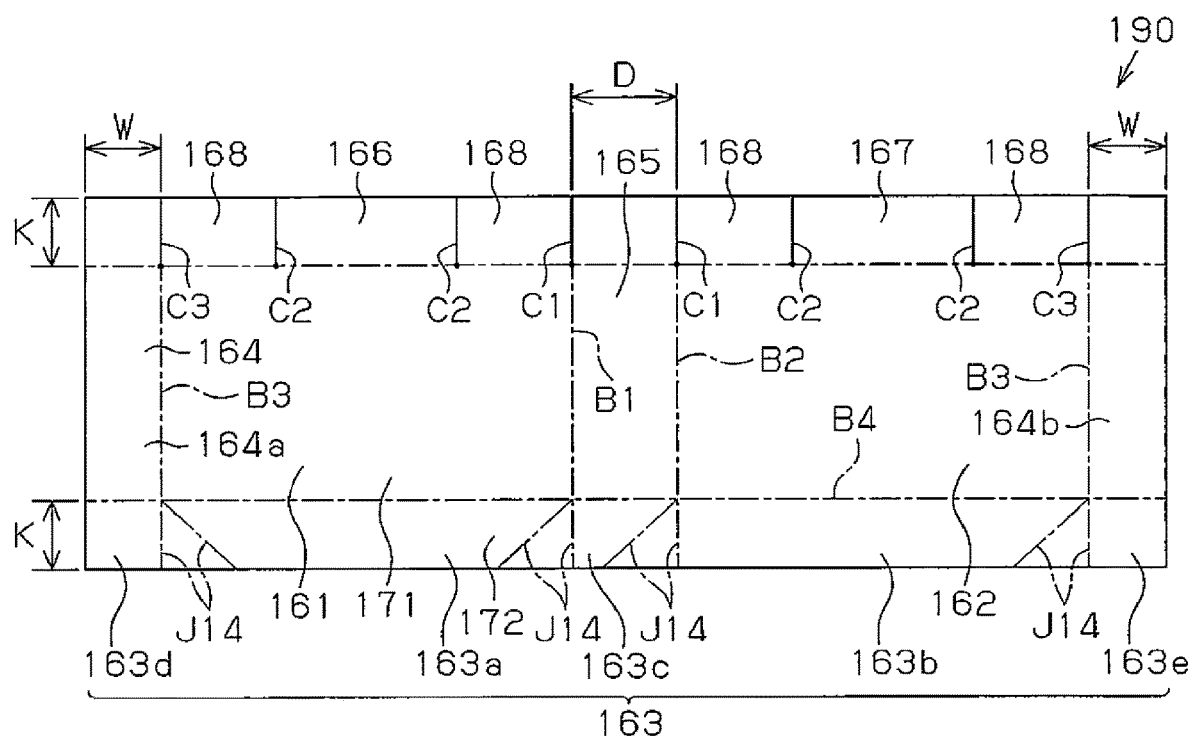
FIG. 42 is a front view of a spread insulating sheet in a modification.

In the sixth embodiment, as shown in FIG. 20, the folding line J11 is not present on the third part 163c. However, for example, as shown in FIG. 42, a folding line J14 may be present on the third part 163c. That is, even when the folding line is inclined in either direction, the insulating sheet 190 overlaps in the bottom-face covering portion 163. In summary, as long as the insulating sheet is shaped like a folded box, specific positions of the folding lines may be appropriately changed.

In each of the embodiments, the fixing tape 100 is used to fix the insulating sheets 70, 120, 160, 180, and 190. However, any fixing means may be adopted. For example, the sheets may be fixed by welding or sawing.

In the second and third embodiments, top-face covering portions 138 and 168 cover the upper end face 36 of the electrode assembly 14 except for the tabs 41 and 42 and however, only need to cover any area except for the tabs 41 and 42, and may partially cover a part of the area except for the tabs 41 and 42 as in the fourth embodiment.

The electrode assembly is not limited to a so-called layered electrode assembly, but may be a so-called wound electrode assembly. In summary, the electrode assembly may take any shape as long as it can be housed in the box-like insulating sheet.

In each of the embodiments, the negative electrode 22 is smaller than the separator 23. However, they may take the same shape. In this case, end faces of the negative electrode 22 and end faces of the separator 23 define the faces 33 to 36 of the electrode assembly 14.

The separator 23 may use any material as long as it is a porous film through which lithium ions can pass while suppressing a short circuit of each of the electrodes 21 and 22. For example, a porous polymer film made of polyolefin including polyethylene or multiple films thereof, or a film having both ceramic-coated faces may be used.

The positive electrode, the negative electrode, and the separator may be square. They are not limited to be rectangular, but may be polygonal other than tetragon or may be elliptic.

In each of the embodiments, the rechargeable batteries 10, 110 are each the lithium-ion rechargeable battery. However, the batteries 10, 110 may be other rechargeable batteries such as a nickel-hydride cell. In summary, any battery in which ions move between a positive-electrode active material layer and a negative-electrode active material layer to give and receive electrical charge may be used.

The present invention may apply to other power storage devices such as an electric double layer capacitor.

In each of the embodiments, the rechargeable batteries 10, 110 are installed in a vehicle, but, may be installed in other devices.

The technical ideas obtainable from the above embodiments and modifications other than those disclosed in the claim section are described below.

(1) A power storage device including:
an electrode assembly that has an opposed region, where a positive-electrode active material layer is opposed to a negative-electrode active material layer, and a first end face in a direction orthogonal to an opposing direction of the opposed region, the first end face having a tab projecting therefrom;
a case that houses the electrode assembly; and
an insulating sheet that insulates the electrode assembly from the case,
the power storage device being characterized in that the insulating sheet is folded into a box having two primary-face covering portions that cover respective primary faces located on both sides in the opposing direction of the electrode assembly, and non-primary-face covering portions that are continuous with the primary-face covering portions, are orthogonal to the opposing direction of the electrode assembly, and cover faces other than the first end face, and
the insulating sheet partially overlaps in the non-primary-face covering portions.

(2) The power storage device according to the technical concept (1), characterized in that the non-primary-face covering portions includes
a first non-primary-face covering portion that is continuous with both of the primary-face covering portions and constitutes a rectangular base portion along with the primary-face covering portions in the insulating sheet in the spread state, and
a second non-primary-face covering portion that extends to one side of the base portion in the insulating sheet in the spread state, wherein the second non-primary-face covering portion is configured of a first part and a second part, which are continuous with the primary-face covering portions, and a third part continuous with the first non-primary-face covering portion,
the insulating sheet is folded along boundary lines of the primary-face covering portions, the first non-primary-face covering portion, and the second non-primary-face covering portion to form a box, and
the parts overlap at least partially with each other in the box-like insulating sheet.

(3) The power storage device according to the technical concept (2), characterized in that the length of the second non-primary-face covering portion in a direction orthogonal to the boundary line between the second non-primary-face covering portion and the base portion is greater than half the length of the electrode assembly in the stacking direction, and is less than or equal to the length of the electrode assembly in the stacking direction.

DESCRIPTION OF THE REFERENCE NUMERALS

10, 110 ... rechargeable battery (power storage device), 11 ... case, 12, 112 ... container, 12a, 112a ... opening of container, 14 ... electrode assembly, 21b ... positive-electrode active material layer, 22b ... negative-electrode active material layer, 24 ... opposed region, 31, 32 ... primary face of electrode assembly, 33 ... bottom face (second end face) of electrode assembly, 34, 35 ... side face of electrode assembly, 36 ... upper end face (first end face) of electrode assembly, 41 ... positive-electrode tab, 42 ... negative-electrode tab, 51 ... positive-electrode terminal, 52 ... negative-electrode terminal, 61 ... positive-electrode conductive member, 62 ... negative-electrode conductive member, 70 ... insulating sheet, 81, 82, 131, 132, 161, 162 ... primary-face covering portions, 83, 133, 163, 203, 213, 223 ... bottom-face covering portion (non-primary-face covering portion), 84, 85, 134, 135, 164, 165 ... side-face covering portions (non-primary-face covering portions), 86 ... protruding portion, 91, 141, 171 ... base portion, 111 ... case in the second embodiment, 120 ... insulating sheet in the second embodiment, 136, 137, 166, 167, 181, 182 ... protruding portions, 138, 168, 183 ... top-face covering portion (non-primary-face covering portion), 151 ... hole, 160 ... insulating sheet in the third and fifth embodiments, 180 ... insulating sheet in the fourth embodiment, 190 ... insulating sheet in the sixth embodiment, 210, 220 ... insulating sheet in a modification, B1 to B6 ... boundary line, C1 to C3, C11 to C18 ... incision, J1 to J4, J11 to J14 ... folding line, D ... thickness of electrode assembly, W ... first width, K ... protruding dimension.

The invention claimed is:

1. A power storage device comprising:
an electrode assembly with a layered structure in which a positive electrode and a negative electrode are stacked, the electrode assembly being configured to have a first end face parallel with a stacking direction, two primary faces located on both sides in the stacking direction, and a tab extending from the first end face in a direction orthogonal to the stacking direction;
a case configured to house the electrode assembly; and
an insulating sheet configured to insulate the electrode assembly from the case, wherein
the insulating sheet is shaped like a folded box, has two primary-face covering portions that cover the primary faces of the electrode assembly, and has non-primary-face covering portions that cover the first end face of the electrode assembly and faces other than the primary faces and are continuous with the primary-face covering portions, the non-primary-face covering portions include a bottom-face covering portion that covers a second end face, which is an end face opposite to the first end face of the electrode assembly, and two side-face covering portions that cover both side faces, which are two end faces orthogonal to the primary faces, and the second end face, the side-face covering portions have parts that overlap in layers at least partially, in the insulating sheet in a spread state, the bottom-face covering portion is continuous with the primary-face covering portions and provided between the primary-face covering portions, in the insulating sheet in the spread state, the primary-face covering portions and the bottom-face covering portion constitute a rectangular base portion as a whole, in the insulating sheet in the spread state, the side-face covering portions extend along sides of the base portion, the insulating sheet is folded along each of boundary lines between the primary-face covering portions and the bottom-face covering portion and boundary lines between the base portion and the side-face covering portions to form a box, given that a length of the electrode assembly in the stacking direction is D and an extending length of the side-face covering portions from the base portion is W, the length D and the length W are set to satisfy a relationship of D/2<W≤D, the case has an opening into which the electrode assembly is inserted, the electrode assembly surrounded by the insulating sheet is inserted into the opening so as to be housed in the case, the parts of the side-face covering portions overlap in layers such that one of the parts that is continuous with the bottom-face covering portion that covers the second end face from which the electrode assembly is inserted into the case is an outermost layer of the parts of the side-face covering portions, and the outermost layer of the side-face covering portions is folded from the bottom-face covering portion to the side-face covering portions, wherein the boundary lines for folding are configured to be thinner than other areas of the insulating sheet, wherein the insulating sheet is folded without any incision to cover each face except for an upper end of the electrode assembly.

2. The power storage device according to claim 1, wherein the insulating sheet in a spread state is rectangular as a whole.

3. The power storage device according to claim 1, wherein in the insulating sheet in the spread state, the side-face covering portions have incisions formed from ends of the boundary lines between the primary-face covering portions and the bottom-face covering portion along extended lines of the boundary line, and the side-face covering portions divided into a plurality of sections by the incisions overlap each other.

4. The power storage device according to claim 1, wherein the bottom-face covering portion has parts that overlap at least partially.

5. The power storage device according to claim 1, wherein the insulating sheet covers a predetermined region of the first end face other than a region where the tab extends.

6. The power storage device according to claim 1, wherein the power storage device is a rechargeable battery.

7. The power storage device according to claim 1, wherein in the insulating sheet in a spread state, the one of the parts of the side-face covering portions to be the outermost layer is continuous with the bottom-face covering portion in a longitudinal direction of the bottom-face covering portion that is included in the base portion.

8. A power storage device comprising:
an electrode assembly with a layered structure in which a positive electrode and a negative electrode are stacked, the electrode assembly being configured to have a first end face parallel with a stacking direction, two primary faces located on both sides in the stacking direction, and a tab extending from the first end face in a direction orthogonal to the stacking direction;
a case configured to house the electrode assembly; and
an insulating sheet configured to insulate the electrode assembly from the case, wherein
the insulating sheet is shaped like a folded box, has two primary-face covering portions that cover the primary faces of the electrode assembly, and has non-primary-face covering portions that cover the first end face of the electrode assembly and faces other than the primary faces and are continuous with the primary-face covering portions,
the non-primary-face covering portions include a bottom-face covering portion that covers a second end face, which is an end face opposite to the first end face of the electrode assembly, and two side-face covering portions that cover both side faces, which are two end faces orthogonal to the primary faces, and the second end face,
the side-face covering portions have parts that overlap in layers at least partially,
in the insulating sheet in a spread state, the bottom-face covering portion is continuous with the primary-face covering portions and provided between the primary-face covering portions,
in the insulating sheet in the spread state, the primary-face covering portions and the bottom-face covering portion constitute a rectangular base portion as a whole,
in the insulating sheet in the spread state, the side-face covering portions extend along sides of the base portion,
the insulating sheet is folded along each of boundary lines between the primary-face covering portions and the bottom-face covering portion and boundary lines between the base portion and the side-face covering portions to form a box,
given that a length of the electrode assembly in the stacking direction is D and an extending length of the side-face covering portions from the base portion is W, the length D and the length W are set to satisfy a relationship of D/2<W≤D,
the case has an opening into which the electrode assembly is inserted,
the electrode assembly surrounded by the insulating sheet is inserted into the opening so as to be housed in the case,
the parts of the side-face covering portions overlap in layers such that one of the parts that is continuous with the bottom-face covering portion that covers the second end face from which the electrode assembly is inserted into the case is an outermost layer of the parts of the side-face covering portions, and the outermost layer of the side-face covering portions is folded from the bottom-face covering portion to the side-face covering portions, wherein in the insulating sheet in the spread state, the power storage device further comprises a protruding portion configured to extend from two opposed sides of the base portion in a direction orthogonal to an extending direction of the side-face covering portions, in a folded state in which the insulating sheet is folded to shape like a box, the protruding portion entirely linearly protrudes from a corresponding one of the primary-face covering portions in a projecting direction of the tab, in which the tab projects from the first end face of the electrode assembly, and is located between the tab and the case, and given that a projecting length of the tab from the first end face is T0, and a protruding dimension of the protruding portion from the first end face is K, the length T0 and the dimension K are set to satisfy a relationship of K≥T0, and the length D and the length T0 are set to satisfy a relationship of T0≤D/2.

9. The power storage device according to claim 8, further comprising:

an electrode terminal partially exposed from the case;

a conductive member configured to connect the tab to the electrode terminal, and in the insulating sheet in the spread state, the protruding portion configured to extend from two opposed sides of the base portion in a direction orthogonal to the extending direction of the side-face covering portions, wherein, given a length of the tab and the conductive member from the first end face in the direction orthogonal to the first end face is T1, and a protruding dimension of the protruding portion from the first end face is K, the length D, the length T1, and the dimension K are set to satisfy a relationship of 0<T1<K<D.

10. A power storage device comprising:

an electrode assembly with a layered structure in which a positive electrode and a negative electrode are stacked, the electrode assembly being configured to have a first end face parallel with a stacking direction, two primary faces located on both sides in the stacking direction, and a tab extending from the first end face in a direction orthogonal to the stacking direction;

a case configured to house the electrode assembly; and an insulating sheet configured to insulate the electrode assembly from the case, wherein the insulating sheet is shaped like a folded box, has two primary-face covering portions that cover the primary faces of the electrode assembly, and has non-primary-face covering portions that cover the first end face of the electrode assembly and faces other than the primary faces and are continuous with the primary-face covering portions, the non-primary-face covering portions include a bottom-face covering portion that covers a second end face, which is an end face opposite to the first end face of the electrode assembly, and two side-face covering portions that cover both side faces, which are two end faces orthogonal to the primary faces, and the second end face, the side-face covering portions have parts that overlap in layers at least partially, in the insulating sheet in a spread state, the bottom-face covering portion is continuous with the primary-face covering portions and provided between the primary-face covering portions, in the insulating sheet in the spread state, the primary-face covering portions and the bottom-face covering portion constitute a rectangular base portion as a whole, in the insulating sheet in the spread state, the side-face covering portions extend along sides of the base portion, the insulating sheet is folded along each of boundary lines between the primary-face covering portions and the bottom-face covering portion and boundary lines between the base portion and the side-face covering portions to form a box, given that a length of the electrode assembly in the stacking direction is D and an extending length of the side-face covering portions from the base portion is W, the length D and the length W are set to satisfy a relationship of D/2<W≤D, the case has an opening into which the electrode assembly is inserted, the electrode assembly surrounded by the insulating sheet is inserted into the opening so as to be housed in the case, the parts of the side-face covering portions overlap in layers such that one of the parts that is continuous with the bottom-face covering portion that covers the second end face from which the electrode assembly is inserted into the case is an outermost layer of the parts of the side-face covering portions, and the outermost layer of the side-face covering portions is folded from the bottom-face covering portion to the side-face covering portions, wherein in the insulating sheet in the spread state, the side-face covering portions have incisions formed from ends of the boundary lines between the primary-face covering portions and the bottom-face covering portion along extended lines of the boundary line, and the side-face covering portions divided into a plurality of sections by the incisions overlap each other, wherein ends of the incisions on the side of the base portion each have a hole.

11. The power storage device according to claim 10, wherein an overlapping area of the parts of the bottom-face covering portion is in contact with an inner face of the case.

* * * * *